(12) United States Patent
Mukkavilli et al.

(10) Patent No.: US 11,950,241 B2
(45) Date of Patent: *Apr. 2, 2024

(54) SELF-CONTAINED TIME DIVISION DUPLEX (TDD) SUBFRAME STRUCTURE FOR WIRELESS COMMUNICATIONS

(71) Applicant: QUALCOMM Incorporated, San Diego, CA (US)

(72) Inventors: Krishna Kiran Mukkavilli, San Diego, CA (US); Tingfang Ji, San Diego, CA (US); Naga Bhushan, San Diego, CA (US); Joseph Binamira Soriaga, San Diego, CA (US); Peter Gaal, San Diego, CA (US); John Edward Smee, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/544,604

(22) Filed: Aug. 19, 2019

(65) Prior Publication Data

US 2019/0373629 A1 Dec. 5, 2019

Related U.S. Application Data

(63) Continuation of application No. 15/821,391, filed on Nov. 22, 2017, now Pat. No. 10,390,361, which is a
(Continued)

(51) Int. Cl.
*H04W 72/23* (2023.01)
*H04L 1/00* (2006.01)
(Continued)

(52) U.S. Cl.
CPC ............... *H04W 72/23* (2023.01); *H04L 1/00* (2013.01); *H04L 1/1671* (2013.01);
(Continued)

(58) Field of Classification Search
CPC ......... H04W 72/1289; H04W 72/0446; H04W 76/00; H04L 1/1671; H04L 1/1854;
(Continued)

(56) References Cited

U.S. PATENT DOCUMENTS

RE39,375 E 11/2006 Hamalainen et al.
7,280,467 B2 10/2007 Smee et al.
(Continued)

FOREIGN PATENT DOCUMENTS

CN 1685639 A 10/2005
CN 101060389 A 10/2007
(Continued)

OTHER PUBLICATIONS

JPO Appeal Decision for JP Application No. 2017-559010 (Appeal No. 2018-13500) mailed Aug. 26, 2019 (original Japanese language document provided by Japanese Patent Office; English-language translation provided by JP counsel).
(Continued)

*Primary Examiner* — Mang Hang Yeung
(74) *Attorney, Agent, or Firm* — QUALCOMM IP DEPT.; James Hunt Yancey, Jr.

(57) ABSTRACT

Aspects of the present disclosure provide a self-contained subframe structure for time division duplex (TDD) carriers. Information transmitted on a TDD carrier may be grouped into subframes, and each subframe can provide communications in both directions (e.g., uplink and downlink) to enable such communications without needing further information in another subframe. In one aspect of the disclosure, a single subframe may include scheduling information, data
(Continued)

transmission corresponding to the scheduling information, and acknowledgment packets corresponding to the data transmission. Furthermore, the subframe may additionally include a header and/or a trailer to provide certain bi-directional communications functions.

52 Claims, 11 Drawing Sheets

Related U.S. Application Data continuation of application No. 14/943,796, filed on Nov. 17, 2015, now Pat. No. 9,936,519.

(60) Provisional application No. 62/133,390, filed on Mar. 15, 2015.

(51) Int. Cl.
   *H04L 1/1607*   (2023.01)
   *H04L 1/1829*   (2023.01)
   *H04L 5/00*     (2006.01)
   *H04L 5/14*     (2006.01)
   *H04W 72/0446*  (2023.01)
   *H04W 76/00*    (2018.01)

(52) U.S. Cl.
   CPC .......... *H04L 1/1854* (2013.01); *H04L 5/0044* (2013.01); *H04L 5/0055* (2013.01); *H04L 5/1469* (2013.01); *H04W 72/0446* (2013.01); *H04W 76/00* (2013.01); *H04L 5/0048* (2013.01)

(58) Field of Classification Search
   CPC ....... H04L 1/00; H04L 5/0044; H04L 5/0055; H04L 5/1469; H04L 5/0048; H04L 1/0026
   USPC ....................................................... 370/280
   See application file for complete search history.

(56) References Cited

U.S. PATENT DOCUMENTS

| | | | |
|---|---|---|---|
| 7,515,579 B2 | 4/2009 | Cheng et al. |
| 8,213,345 B2 | 7/2012 | Suo et al. |
| 8,363,597 B2 | 1/2013 | Abraham et al. |
| 8,396,013 B2 | 3/2013 | Khandekar et al. |
| 8,472,465 B2 | 6/2013 | Suo et al. |
| 8,531,997 B2 | 9/2013 | Ahn et al. |
| 8,599,702 B2 | 12/2013 | Kim et al. |
| 8,614,977 B2 | 12/2013 | Wu et al. |
| 8,700,023 B2 | 4/2014 | Nan et al. |
| 8,724,636 B2 | 5/2014 | Chen et al. |
| 8,756,477 B2 | 6/2014 | Challa et al. |
| 8,787,344 B2 | 7/2014 | Malladi et al. |
| 8,804,618 B2 | 8/2014 | Hu et al. |
| 8,848,620 B2 | 9/2014 | Fan et al. |
| 8,855,062 B2 | 10/2014 | Khandekar et al. |
| 8,861,408 B2 | 10/2014 | Damnjanovic et al. |
| 8,923,223 B2 | 12/2014 | Chen et al. |
| 8,948,064 B2 | 2/2015 | Shahar |
| 9,001,780 B2 | 4/2015 | Chen et al. |
| 9,083,517 B2 | 7/2015 | Chen et al. |
| 9,100,155 B2 | 8/2015 | Luo et al. |
| 9,113,491 B2 | 8/2015 | Montojo et al. |
| 9,369,877 B2 | 6/2016 | Liu et al. |
| 9,398,575 B2 | 7/2016 | Clevorn |
| 9,584,290 B2 | 2/2017 | Prakash et al. |
| 9,609,636 B2 | 3/2017 | Yang et al. |
| 9,642,124 B2 | 5/2017 | Li et al. |
| 9,814,058 B2 | 11/2017 | Jiang et al. |
| 9,930,687 B2 | 3/2018 | Mizusawa et al. |
| 9,936,519 B2 | 4/2018 | Mukkavilli et al. |
| 9,955,460 B2 | 4/2018 | Tavildar et al. |
| 9,974,093 B2 | 5/2018 | Lin et al. |
| 9,992,790 B2 | 6/2018 | Jiang et al. |
| 10,003,986 B2 | 6/2018 | Liu et al. |
| 10,075,970 B2 | 9/2018 | Jiang et al. |
| 10,123,219 B2 | 11/2018 | Bhushan et al. |
| 10,219,292 B2 | 2/2019 | Damnjanovic et al. |
| 10,342,012 B2 | 7/2019 | Mukkavilli et al. |
| 10,411,871 B2 | 9/2019 | Liu et al. |
| 10,512,098 B2 | 12/2019 | Jiang et al. |
| 10,624,156 B2 | 4/2020 | Xiong et al. |
| 11,109,351 B2 | 8/2021 | Lee et al. |
| 2001/0028629 A1 | 10/2001 | Uneyama et al. |
| 2002/0097695 A1 | 7/2002 | Herrmann |
| 2003/0108013 A1 | 6/2003 | Hwang et al. |
| 2005/0197680 A1 | 9/2005 | Delmain et al. |
| 2006/0062192 A1 | 3/2006 | Payne, III |
| 2007/0211656 A1 | 9/2007 | Kwak et al. |
| 2008/0070586 A1 | 3/2008 | Kermoal et al. |
| 2008/0075042 A1 | 3/2008 | Shih |
| 2008/0080476 A1 | 4/2008 | Cho et al. |
| 2008/0220791 A1 | 9/2008 | Cho et al. |
| 2009/0040999 A1 | 2/2009 | Yuk |
| 2009/0103482 A1 | 4/2009 | Imamura et al. |
| 2009/0129259 A1 | 5/2009 | Malladi et al. |
| 2009/0137230 A1 | 5/2009 | Miyoshi et al. |
| 2009/0141690 A1 | 6/2009 | Fan et al. |
| 2009/0161591 A1 | 6/2009 | Ahmadi et al. |
| 2009/0161649 A1 | 6/2009 | Ponnathota et al. |
| 2009/0181689 A1 | 7/2009 | Lee et al. |
| 2009/0201838 A1 | 8/2009 | Zhang et al. |
| 2009/0213769 A1 | 8/2009 | Shen et al. |
| 2009/0245194 A1 | 10/2009 | Damnjanovic et al. |
| 2009/0276676 A1 | 11/2009 | Lee et al. |
| 2009/0323666 A1 | 12/2009 | Malladi et al. |
| 2010/0080137 A1 | 4/2010 | Vedantham et al. |
| 2010/0103892 A1 | 4/2010 | Abrahamsson et al. |
| 2010/0118730 A1 | 5/2010 | Tanaka et al. |
| 2010/0211845 A1 | 8/2010 | Lee et al. |
| 2010/0265851 A1 | 10/2010 | Shahar |
| 2010/0275086 A1 | 10/2010 | Bergquist et al. |
| 2010/0309867 A1 | 12/2010 | Palanki et al. |
| 2010/0322114 A1 | 12/2010 | Li et al. |
| 2011/0007730 A1 | 1/2011 | Han et al. |
| 2011/0167326 A1 | 7/2011 | Kuri et al. |
| 2011/0211503 A1 | 9/2011 | Che et al. |
| 2011/0274063 A1* | 11/2011 | Li .......................... H04L 5/0053 370/329 |
| 2011/0310777 A1 | 12/2011 | Jiang et al. |
| 2011/0310778 A1 | 12/2011 | Seo et al. |
| 2011/0310784 A1 | 12/2011 | Park |
| 2011/0310802 A1 | 12/2011 | Song et al. |
| 2011/0310830 A1 | 12/2011 | Wu et al. |
| 2012/0057547 A1 | 3/2012 | Loehr et al. |
| 2012/0135773 A1 | 5/2012 | Shen et al. |
| 2012/0147773 A1* | 6/2012 | Kim ...................... H04L 1/0025 370/252 |
| 2012/0230232 A1 | 9/2012 | Ji et al. |
| 2012/0250592 A1 | 10/2012 | Chun et al. |
| 2012/0257554 A1 | 10/2012 | Kim et al. |
| 2012/0275355 A1 | 11/2012 | Park et al. |
| 2012/0287882 A1 | 11/2012 | Kim et al. |
| 2012/0294204 A1 | 11/2012 | Chen et al. |
| 2012/0300738 A1 | 11/2012 | Palanki et al. |
| 2013/0028205 A1 | 1/2013 | Damnjanovic et al. |
| 2013/0039193 A1 | 2/2013 | Yin et al. |
| 2013/0039231 A1 | 2/2013 | Wang |
| 2013/0083736 A1 | 4/2013 | Yin et al. |
| 2013/0083740 A1 | 4/2013 | Eriksson et al. |
| 2013/0121186 A1 | 5/2013 | Vajapeyam et al. |
| 2013/0128781 A1 | 5/2013 | Li et al. |
| 2013/0163536 A1 | 6/2013 | Anderson et al. |
| 2013/0194980 A1 | 8/2013 | Yin et al. |
| 2013/0242822 A1 | 9/2013 | Yang et al. |
| 2013/0242904 A1 | 9/2013 | Sartori et al. |
| 2013/0286902 A1 | 10/2013 | Chen et al. |
| 2013/0301486 A1 | 11/2013 | Kishiyama et al. |
| 2013/0315113 A1 | 11/2013 | Seo et al. |
| 2013/0343239 A1 | 12/2013 | Damnjanovic et al. |

(56) References Cited

U.S. PATENT DOCUMENTS

| | | |
|---|---|---|
| 2014/0023004 A1 | 1/2014 | Kumar et al. |
| 2014/0036740 A1 | 2/2014 | Lee et al. |
| 2014/0044061 A1 | 2/2014 | Yue et al. |
| 2014/0050192 A1 | 2/2014 | Kim et al. |
| 2014/0071921 A1 | 3/2014 | Wang et al. |
| 2014/0071954 A1 | 3/2014 | Au et al. |
| 2014/0086078 A1 | 3/2014 | Malladi et al. |
| 2014/0106688 A1 | 4/2014 | Negus et al. |
| 2014/0120969 A1 | 5/2014 | Sang et al. |
| 2014/0126499 A1 | 5/2014 | Li et al. |
| 2014/0133369 A1 | 5/2014 | Cheng et al. |
| 2014/0146798 A1 | 5/2014 | Damnjanovic et al. |
| 2014/0153450 A1 | 6/2014 | Jang et al. |
| 2014/0153453 A1 | 6/2014 | Park et al. |
| 2014/0169238 A1* | 6/2014 | Cai .................. H04L 1/1887 370/280 |
| 2014/0185539 A1 | 7/2014 | Seo et al. |
| 2014/0204783 A1 | 7/2014 | Lin et al. |
| 2014/0204807 A1 | 7/2014 | Li et al. |
| 2014/0226552 A1 | 8/2014 | Niu et al. |
| 2014/0233469 A1 | 8/2014 | Seo et al. |
| 2014/0241225 A1 | 8/2014 | Novak et al. |
| 2014/0269541 A1 | 9/2014 | Khude et al. |
| 2014/0286255 A1 | 9/2014 | Nam et al. |
| 2014/0301252 A1 | 10/2014 | Choi et al. |
| 2014/0307597 A1 | 10/2014 | Kim et al. |
| 2014/0321382 A1 | 10/2014 | Guan |
| 2014/0341091 A1 | 11/2014 | Ji et al. |
| 2014/0342745 A1 | 11/2014 | Bhushan et al. |
| 2015/0003304 A1 | 1/2015 | Wu et al. |
| 2015/0036561 A1 | 2/2015 | Wang et al. |
| 2015/0043392 A1 | 2/2015 | Susitaival et al. |
| 2015/0043394 A1 | 2/2015 | Lin et al. |
| 2015/0043395 A1 | 2/2015 | Dai et al. |
| 2015/0085713 A1 | 3/2015 | He et al. |
| 2015/0085834 A1 | 3/2015 | Liu et al. |
| 2015/0092566 A1 | 4/2015 | Balachandran et al. |
| 2015/0092703 A1 | 4/2015 | Xu et al. |
| 2015/0103702 A1 | 4/2015 | Lahetkangas et al. |
| 2015/0109972 A1 | 4/2015 | Khoryaev et al. |
| 2015/0139139 A1 | 5/2015 | Park et al. |
| 2015/0146588 A1 | 5/2015 | Park |
| 2015/0156762 A1 | 6/2015 | Hwang et al. |
| 2015/0180619 A1 | 6/2015 | Majjigi et al. |
| 2015/0180622 A1 | 6/2015 | Yoo et al. |
| 2015/0180636 A1 | 6/2015 | Malladi et al. |
| 2015/0181580 A1 | 6/2015 | Aiba et al. |
| 2015/0181612 A1 | 6/2015 | Gan et al. |
| 2015/0188650 A1 | 7/2015 | Au et al. |
| 2015/0237619 A1 | 8/2015 | Yang et al. |
| 2015/0249980 A1 | 9/2015 | You et al. |
| 2015/0264662 A1 | 9/2015 | Sahlin et al. |
| 2015/0271837 A1 | 9/2015 | Larsson et al. |
| 2015/0312889 A1 | 10/2015 | Lee et al. |
| 2015/0326291 A1 | 11/2015 | Wong et al. |
| 2015/0327196 A1 | 11/2015 | Blankenship et al. |
| 2015/0333898 A1 | 11/2015 | Ji et al. |
| 2015/0349929 A1 | 12/2015 | Bhorkar et al. |
| 2015/0358918 A1 | 12/2015 | Gao et al. |
| 2016/0020891 A1 | 1/2016 | Jung et al. |
| 2016/0028512 A1 | 1/2016 | Papasakellariou |
| 2016/0112181 A1 | 4/2016 | Tabet et al. |
| 2016/0119840 A1 | 4/2016 | Loehr et al. |
| 2016/0142292 A1 | 5/2016 | Au et al. |
| 2016/0182213 A1 | 6/2016 | Golitschek Edler Von Elbwart et al. |
| 2016/0192396 A1 | 6/2016 | Ng |
| 2016/0205683 A1 | 7/2016 | Quan et al. |
| 2016/0205690 A1 | 7/2016 | Berggren et al. |
| 2016/0212734 A1 | 7/2016 | He et al. |
| 2016/0219518 A1 | 7/2016 | Zhao et al. |
| 2016/0219569 A1 | 7/2016 | Kuo et al. |
| 2016/0227425 A1 | 8/2016 | Kim et al. |
| 2016/0233904 A1 | 8/2016 | Wu et al. |
| 2016/0234834 A1 | 8/2016 | Aboul-Magd et al. |
| 2016/0249329 A1 | 8/2016 | Au et al. |
| 2016/0270060 A1 | 9/2016 | Kusashima et al. |
| 2016/0270070 A1 | 9/2016 | Mukkavilli et al. |
| 2016/0270103 A1 | 9/2016 | Jiang et al. |
| 2016/0270115 A1 | 9/2016 | Mukkavilli et al. |
| 2016/0294531 A1 | 10/2016 | Loehr et al. |
| 2016/0315741 A1 | 10/2016 | Tsai et al. |
| 2016/0323852 A1 | 11/2016 | Golitschek et al. |
| 2016/0323854 A1 | 11/2016 | Gao et al. |
| 2016/0330010 A1 | 11/2016 | Qin et al. |
| 2016/0330737 A1 | 11/2016 | Takeda et al. |
| 2016/0338081 A1 | 11/2016 | Jiang et al. |
| 2016/0366704 A1 | 12/2016 | Lee et al. |
| 2016/0374082 A1 | 12/2016 | Nguyen et al. |
| 2017/0013565 A1 | 1/2017 | Pelletier et al. |
| 2017/0013610 A1 | 1/2017 | Lee et al. |
| 2017/0013673 A1 | 1/2017 | Uchino et al. |
| 2017/0019905 A1 | 1/2017 | Ko et al. |
| 2017/0019930 A1 | 1/2017 | Lee et al. |
| 2017/0085344 A1 | 3/2017 | Yang |
| 2017/0111106 A1 | 4/2017 | Lee et al. |
| 2017/0118743 A1 | 4/2017 | Kim et al. |
| 2017/0150367 A1 | 5/2017 | Han et al. |
| 2017/0150424 A1 | 5/2017 | Lee et al. |
| 2017/0215188 A1 | 7/2017 | Kim et al. |
| 2017/0215201 A1 | 7/2017 | Kim et al. |
| 2017/0257878 A1 | 9/2017 | Kazmi et al. |
| 2017/0290008 A1 | 10/2017 | Tooher et al. |
| 2017/0303144 A1 | 10/2017 | Guo et al. |
| 2017/0318564 A1 | 11/2017 | Lee et al. |
| 2017/0367058 A1 | 12/2017 | Pelletier et al. |
| 2017/0367084 A1 | 12/2017 | Cheng et al. |
| 2018/0006743 A1 | 1/2018 | Zhu et al. |
| 2018/0035430 A1 | 2/2018 | Futaki |
| 2018/0041312 A1 | 2/2018 | Li et al. |
| 2018/0042035 A1 | 2/2018 | Jiang et al. |
| 2018/0048431 A1 | 2/2018 | Wang et al. |
| 2018/0098348 A1 | 4/2018 | Mukkavilli et al. |
| 2018/0124783 A1 | 5/2018 | Mukkavilli et al. |
| 2018/0198570 A1 | 7/2018 | Astely et al. |
| 2018/0294943 A1 | 10/2018 | Hwang et al. |
| 2019/0007956 A1 | 1/2019 | Jiang et al. |
| 2019/0098622 A1 | 3/2019 | Lee et al. |
| 2019/0222364 A1 | 7/2019 | Shimoda et al. |
| 2019/0289602 A1 | 9/2019 | Mukkavilli et al. |
| 2019/0335481 A1 | 10/2019 | Jiang et al. |
| 2020/0084784 A1 | 3/2020 | Jiang et al. |
| 2020/0367266 A1 | 11/2020 | Jiang et al. |
| 2021/0274498 A1 | 9/2021 | Mukkavilli et al. |

FOREIGN PATENT DOCUMENTS

| | | |
|---|---|---|
| CN | 101132262 A | 2/2008 |
| CN | 101156322 A | 4/2008 |
| CN | 101179751 A | 5/2008 |
| CN | 101567773 A | 10/2009 |
| CN | 101836493 A | 9/2010 |
| CN | 101939939 A | 1/2011 |
| CN | 102014514 A | 4/2011 |
| CN | 102150468 A | 8/2011 |
| CN | 102271016 A | 12/2011 |
| CN | 102273095 A | 12/2011 |
| CN | 102404841 A | 4/2012 |
| CN | 102437901 A | 5/2012 |
| CN | 102611525 A | 7/2012 |
| CN | 102687451 A | 9/2012 |
| CN | 102763363 A | 10/2012 |
| CN | 101389120 B | 12/2012 |
| CN | 102835087 A | 12/2012 |
| CN | 103190192 A | 7/2013 |
| CN | 103404063 A | 11/2013 |
| CN | 103563273 A | 2/2014 |
| CN | 103716143 A | 4/2014 |
| CN | 103825671 A | 5/2014 |
| CN | 103840931 A | 6/2014 |
| CN | 103858498 A | 6/2014 |
| CN | 103973397 A | 8/2014 |
| CN | 103973417 A | 8/2014 |
| CN | 104170294 A | 11/2014 |

(56) References Cited

FOREIGN PATENT DOCUMENTS

| | | |
|---|---|---|
| CN | 104218956 A | 12/2014 |
| CN | 104348582 A | 2/2015 |
| CN | 104348589 A | 2/2015 |
| CN | 104348602 A | 2/2015 |
| CN | 107534899 A | 1/2018 |
| EP | 2836044 A1 | 2/2015 |
| EP | 2947792 A1 | 11/2015 |
| EP | 3291599 A1 | 3/2018 |
| JP | 2011503975 A | 1/2011 |
| JP | 2012175258 A | 9/2012 |
| JP | 2013517639 A | 5/2013 |
| JP | 2013544473 A | 12/2013 |
| JP | 2014500685 A | 1/2014 |
| JP | 2014516231 A | 7/2014 |
| JP | 2014222923 A | 11/2014 |
| KR | 20090090994 A | 8/2009 |
| KR | 20100138852 A | 12/2010 |
| KR | 20120052971 A | 5/2012 |
| KR | 20140012658 A | 2/2014 |
| KR | 20140073534 A | 6/2014 |
| KR | 20140077606 A | 6/2014 |
| KR | 20140096433 A | 8/2014 |
| KR | 20150013458 A | 2/2015 |
| KR | 20150013561 A | 2/2015 |
| KR | 20150052002 A | 5/2015 |
| TW | I456936 B | 10/2014 |
| TW | 201446052 A | 12/2014 |
| TW | 201507415 A | 2/2015 |
| TW | I477175 B | 3/2015 |
| WO | 2004064295 | 7/2004 |
| WO | 2008028006 A2 | 3/2008 |
| WO | 2008042541 A1 | 4/2008 |
| WO | 2009022391 A1 | 2/2009 |
| WO | 2009100069 A2 | 8/2009 |
| WO | 2009104922 A2 | 8/2009 |
| WO | 2009124079 A1 | 10/2009 |
| WO | 2010118371 A1 | 10/2010 |
| WO | 2010138925 | 12/2010 |
| WO | 2011011636 A2 | 1/2011 |
| WO | 2011019223 A2 | 2/2011 |
| WO | 2011052961 A2 | 5/2011 |
| WO | 2011071944 | 6/2011 |
| WO | 2011140109 A1 | 11/2011 |
| WO | 2011163265 A1 | 12/2011 |
| WO | 2012024141 A1 | 2/2012 |
| WO | 2012064935 | 5/2012 |
| WO | 2012068141 A1 | 5/2012 |
| WO | 2012102739 A1 | 8/2012 |
| WO | 2012168092 A1 | 12/2012 |
| WO | 2013015587 A2 | 1/2013 |
| WO | 2013025502 | 2/2013 |
| WO | 2013103270 A1 | 7/2013 |
| WO | 2013110228 A1 | 8/2013 |
| WO | 2013112320 A1 | 8/2013 |
| WO | 2013157894 A1 | 10/2013 |
| WO | 2013175181 A1 | 11/2013 |
| WO | 2013176597 A1 | 11/2013 |
| WO | 2014003104 A1 | 1/2014 |
| WO | 2014056430 A1 | 4/2014 |
| WO | 2014067140 A1 | 5/2014 |
| WO | 2014112802 A1 | 7/2014 |
| WO | 2014179964 A1 | 11/2014 |
| WO | 2015048361 A1 | 4/2015 |
| WO | 2016148878 A1 | 9/2016 |
| WO | 2016175015 A1 | 11/2016 |
| WO | 2017123276 A1 | 7/2017 |

OTHER PUBLICATIONS

CATT: "ACK/NACKs Transmission in UpPTS", Agenda Item: 6.1.7, R1-080175, 3GPP TSG RAN WG1 meeting #51bis, Sevilla, Spain, Jan. 14-18, 2008, 7 pages.

Chen S., "A Novel TD-LTE Frame Structure for Heavy Uplink Traffic in Smart Grid", 2014 IEEE Innovative Smart Grid Technologies—Asia (ISGT ASIA), May 23, 2014, pp. 158-163.

Ericsson: "Usage of DwPTS", 3GPP TSG-RAN WG1 #51bis, Agenda Item: 6.1.7, R1-080347, Sevilla, Spain, Jan. 14-18, 2008, 3 pages.

Huawei, et al., "Discussion on new Frame Structure for Latency Reduction in TDD", 3GPP TSG RAN WG1 Meeting #84, R1-160754, St. Julian's, Malta, Feb. 15-19, 2016, 9 Pages.

NEC Group: "UL&DL Timing Coupling Issue for TDD eIMTA System", Agenda Item: 7.2.3.3, R1-133341, 3GPP TSG RAN WG1 Meeting #74, Barcelona, Spain, Aug. 19-23, 2013, 4 pages.

Qualcomm Incorporated: "Summary of Email Discussion on Frame Structure", 3GPP TSG-RAN WG1 #85, 3GPP Draft; R1-165456_Frame_Structure_Discussion, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016, May 24, 2016 (May 24, 2016), pp. 1-28, XP051104210, Retrieved from the Internet: URL: http://www.3gpp.org/ftp/Meetings_3GPP_SYNC/RAN1/Docs/ [retrieved on May 24, 2016].

Texas Instruments: "TDD System Evaluation of Multi-Bit ACK/NAK and ACK/NAK Bundling", Agenda Item: 6.3, R1-083128, 3GPP TSG RAN WG1 #54, Jeju, South Korea, Aug. 18-22, 2008, 4 pages.

Taiwan Search Report—TW107136857—TIPO—dated Aug. 21, 2019.

3GPP 36.211, "3rd Generation Partnership Project, Technical Specification Group Radio Access Network, Evolved Universal Terrestrial Radio Access (E-UTRA), Physical Channels and Modulation (Release 8)", 3GPP Standard, 3GPP TS 36.211 V8.5.0, Dec. 1, 2008 (Dec. 1, 2008), pp. 1-82, XP050377537.

"3rd Generation Partnership Project; Technical Specification Group Radio Access Network; Evolved Universal Terrestrial Radio Access (E-UTRA); Physical channels and modulation (Release 12)", 3GPP Standard; 3GPP TS 36.211, 3rd Generation Partnership Project (3GPP), Mobile Competence Centre ; 650 , Route Des Lucioles ; F-06921 Sophia-Antipolis Cedex; France, vol. RAN WG1, No. V12.4.0, Jan. 3, 2015 (Jan. 3, 2015), pp. 1-124, XP050927386, [retrieved on Jan. 3, 2015] chapter 1 "scope" chapter 4 "Frame structure".

"Chapter 12: Retransmission Protocols" In: Erik Dahlman: "4G LTE/LTE-Advanced for Mobile Broadband", Nov. 30, 2013 (Nov. 30, 2013), Academic Press, XP002758475, pp. 299-319, Sections 12.1, 12.1.3.2.

Co-pending U.S. Appl. No. 15/857,543, filed Dec. 28, 2017.

Co-pending U.S. Appl. No. 15/857,571, filed Dec. 28, 2017.

Eeva L., et al., "Achieving Low Latency and Energy Consumption by 5G TDD Mode Optimization," 2014 IEEE International Conference on Communications Workshops (ICC), IEEE, Jun. 10, 2014 (Jun. 10, 2014), pp. 1-6, XP032630839, DOI: 10.1109/ICCW.2014.6881163 [retrieved on Aug. 20, 2014].

Eeva L., et al., "On the TDD Subframe Structure for Beyond 4G Radio Access Network", 2013 Future Network & Mobile Summit, pp. 1-10, Article No. 6633569, Jul. 3, 2013 (Jul. 3, 2013), XP055335904, Title ; Section 3; figures 3, 6-7.

European Search Report—EP18189408—Search Authority—The Hague—dated Apr. 8, 2019.

European Search Report—EP18195740—Search Authority—The Hague—dated Dec. 13, 2018.

International Preliminary Report on Patentability—PCT/US2016/019935, The International Bureau of WIPO—Geneva, Switzerland, dated Sep. 28, 2017.

International Preliminary Report on Patentability—PCT/US2016/019941, The International Bureau of WIPO—Geneva, Switzerland, dated Sep. 28, 2017.

International Preliminary Report on Patentability—PCT/US2016/019942, The International Bureau of WIPO—Geneva, Switzerland, dated Sep. 28, 2017.

"International Preliminary Report on Patentability—PCT/US2016/022511, The International Bureau of WIPO—Geneva, Switzerland, dated Sep. 19, 2012".

International Preliminary Report on Patentability—PCT/US2016/032526, The International Bureau of WIPO—Geneva, Switzerland, dated Nov. 30, 2017.

(56) References Cited

OTHER PUBLICATIONS

International Preliminary Report on Patentability—PCT/US2016/032526, International Search Authority—European Patent Office, dated Nov. 30, 2017.
International Search Report and Written Opinion—PCT/US2016/019935—ISA/EPO—dated Jun. 30, 2016.
International Search Report and Written Opinion—PCT/US2016/019942—ISA/EPO—dated May 20, 2016.
International Search Report and Written Opinion—PCT/US2016/022511—ISA/EPO—dated Jun. 23, 2016.
International Search Report and Written Opinion—PCT/US2016/032526—ISA/EPO—dated Nov. 7, 2016.
International Search Report and Written Opinion—PCT/US2016/019941—ISA/EPO—dated Jul. 7, 2016.
Levanen T., et al., "Dense Small-Cell Networks: Rethinking the Radio Interface Beyond LTE-Advanced", 1st International Conference on 5G for Ubiquitous Connectivity, ICST, Nov. 26, 2014 (Nov. 26, 2014), pp. 163-169, XP032735039, DOI: 10.4108/ICST.5GU.2014.258115 [retrieved on Feb. 11, 2015].
Levanen T., et al., "Radio Interface Design for Ultra-Low Latency Millimeter-Wave Communications in 5G Era", IEEE Globecom Workshops, Dec. 8-12, 2014, pp. 1420-1426.
Levanen T.A., et al., "Radio Interface Evolution Towards 5G and Enhanced Local Area Communications", IEEE Access, vol. 2, Sep. 17, 2014 (Sep. 17, 2014), pp. 1005-1029, XP011559830, DOI: 10.1109/ACCESS.2014.2355415, Section V; figures 2,4; tables 8,12, Section VI.A; figure 5.
Lu Y., et al., "Uplink Control for Low Latency HARQ in TDD Carrier Aggregation", Vehicular Technology Conference (VTC SPRING), 2012 IEEE 75th, IEEE, May 6, 2012 (May 6, 2012), pp. 1-5, XP032202607, DOI: 10.1109/VETECS.2012.6240190, ISBN: 978-1-4673-0989-9, abstract Section I; p. 1.
Mediatek Inc: "Discussions on UL HARQ for Rel-13 MTC UE", 3GPP Draft, R1-150675 Discussions on UL HARQ for Rel-13 MTC UE, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 9-Feb. 13, 2015 Feb. 8, 2015 (Feb. 8, 2015), pp. 1-5, XP050933875, Retrieved from the Internet: URL:http://www.3gpp.org/ftp/Meetings_3GPP_SYNC/RAN1/Docs/ [retrieved on Feb. 8, 2015] Section 2.
Partial European Search Report—EP18189408—Search Authority—The Hague—dated Nov. 30, 2018.
Partial International Search Report—PCT/US2016/032526—ISA/EPO—dated Sep. 14, 2016.
Pedersen K., et al., "A Flexible Frame Structure for 5G Wide Area", 2015 IEEE 82nd Vehicular Technology Conference (VTC 2015-FALL), Sep. 6, 2015, pp. 1-5, XP032856972, DOI: 10.1109/VTCFALL.2015.7390791 [retrieved on Jan. 25, 2016], 5 pages.
Popovski P.,et al., "Deliverable D2.3 Components of a new air interface-building blocks and performance," Mobile and wireless communications Enablers for the Twenty-twenty Information Society, ICT-317669-METIS/D2.3, 2014, pp. 117.
Popovski P.,et al., "Deliverable D2.4 Proposed solutions for new radio access," Mobile and wireless communications Enablers for the Twenty-twenty Information Society, IICT—317669-M ETIS/D2.4, 2015, pp. 190.
Qualcomm Technologies Inc: "The 5G Unified Air Interface Scalable to an Extreme Variation of Requirements", Nov. 2015, 46 pages.
Smee J.E, "5G Design Across Services," May 12, 2015 (May 12, 2015), XP055299081, Retrieved from the Internet: URL:https://johannesbergsummit.com/wp-content/uploads/sites/6/2014/11/Tuesday_3_John-Smee.pdf [retrieved on Aug. 31, 2016].
Soret B., et al., "Fundamental Tradeoffs among Reliability, Latency and Throughput in Cellular Networks," IEEE roceedings of GLOBECOM, Dec. 2014, pp. 1391-1396.
Taiwan Search Report—TW105105905—TIPO—dated Mar. 28, 2019.
Taiwan Search Report—TW105105683—TIPO—dated Sep. 6, 2018.
Tiedemann E., et al., "5G: The Next Generation (Big Wave) of Wireless," Jul. 22, 2015 (Jul. 22, 2015), XP055280307, Retrieved from the Internet URL:https://www.nttdocomo.co.jp/binary/pdf/corporate/technology/rd/tech/5g/NTTDOCOMO 5G TBS 1ecture6.pdf.
Toni L., et al., "Low latency radio interface for 5G flexible TDD local area conmunications", 2014 IEEE International Conference on Communications Workshops (ICC), IEEE, Jun. 10, 2014 (Jun. 10, 2014), pp. 7-13, XP032630785, DOI: 10.1109/ICCW.2014.6881164 [retrieved on Aug. 20, 2014] the whole document.
ZTE: "Issues About Data Transmission in TDD-eIMTA", 3GPP Draft, R1-132108 Issues About Data Transmission in TDD-eIMTA, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 20, 2013-May 24, 2013 May 11, 2013 (May 11, 2013), pp. 1-4, XP050697886, Retrieved from the Internet: URL: http://www.3gpp.org/ftp/tsg_ran/WG1_RL1/TSGR1_73/Docs/ [retrieved on May 11, 2013] the whole document.
European Search Report—EP20153120—Search Authority—The Hague—dated May 4, 2020.
Nokia: "On HARQ/Scheduling Timing and Self-Contained Operation", 3GPP TSG-RAN WG1 #86 Bis, R1-1609742, Lisbon, Portugal, Oct. 10-14, 2016, 6 Pages.
Ericsson et al., "CSI Feedback Signaling Feedback", R1-103840, 3GPP TSG-RAN WG1 61bis, Dresden, Germany, Jun. 28-Jul. 2, 2010, Jun. 22, 2010, 4 Pages.
Qualcomm, Number of HARQ Interlaces Defined UE Category for Self-contained TDD Subframe, Jun. 8, 2014, 8 pages.
ETRI: "Discussion on HARQ Operation for LAA", [Online] Feb. 8, 2015 (Feb. 8, 2015), 3GPP Draft, 3GPP TSG RAN WG1 Meeting #80, R1-150633-Discussion on HARQ Operation For LAA, 3rd Generation Partnership Project (3GPP), Mobile Competence Centre, 650, Route Des Lucioles, F-06921 Sophia-Antipolis Cedex, France, , vol. Ran WG1, No. Athens, Greece, Feb. 9, 2015-Feb. 13, 2015, XP050933836, pp. 1-12, Retrieved from the Internet: URL:http://www.3gpp.org/ftp/Meetings_3GPP_SYNC/RAN1/Docs/,[retrieved on Feb. 8, 2015] the whole document, Section 3.3, p. 1-p. 4.
ETSI MCC: "Report of RAN2 RAN2 #87bis", R2-144750, 3GPP TSG-RAN Working Group 2 meeting #88, San Francisco, USA, Nov. 16-21, 2014, 124 Pages.
Jiafan W., "TD-SCDMA Base Station Lub Interface Design and Implementation of Protocol Software", China Excellent Master Degree Thesis Full-text database, Nov. 30, 2009, 95 pages.
Qilong H., "Design and Implementation of Baseband Transport Protocol in TDD System", Chinese Master's Theses Full-text Database Information Science and Technology, May 27, 2013, 75 pages.
Qualcomm Incorporated: "Draft TP for D2D for TS 36.300", 3GPP TSG-RAN WG1 #78, R1-142966, Aug. 18-22, 2014, Dresden, Germany, 19 Pages.
RITT: "Introduction of Optimized FS2 for TDD", R1-080660, 3GPP TSG-RAN WG1 Meeting #52, Sorrento, Italy, Feb. 11-15, 2008, 19 Pages.
Ying B., et al., "TD-LTE eNB Performance Test Solution Based on HARQ", Foreign Electronic Measurement Technology, vol. 29, No. 9, Sep. 22, 2010, pp. 1-3.

* cited by examiner

*TDD-TDD Inverse (Conjugate) Pairing*

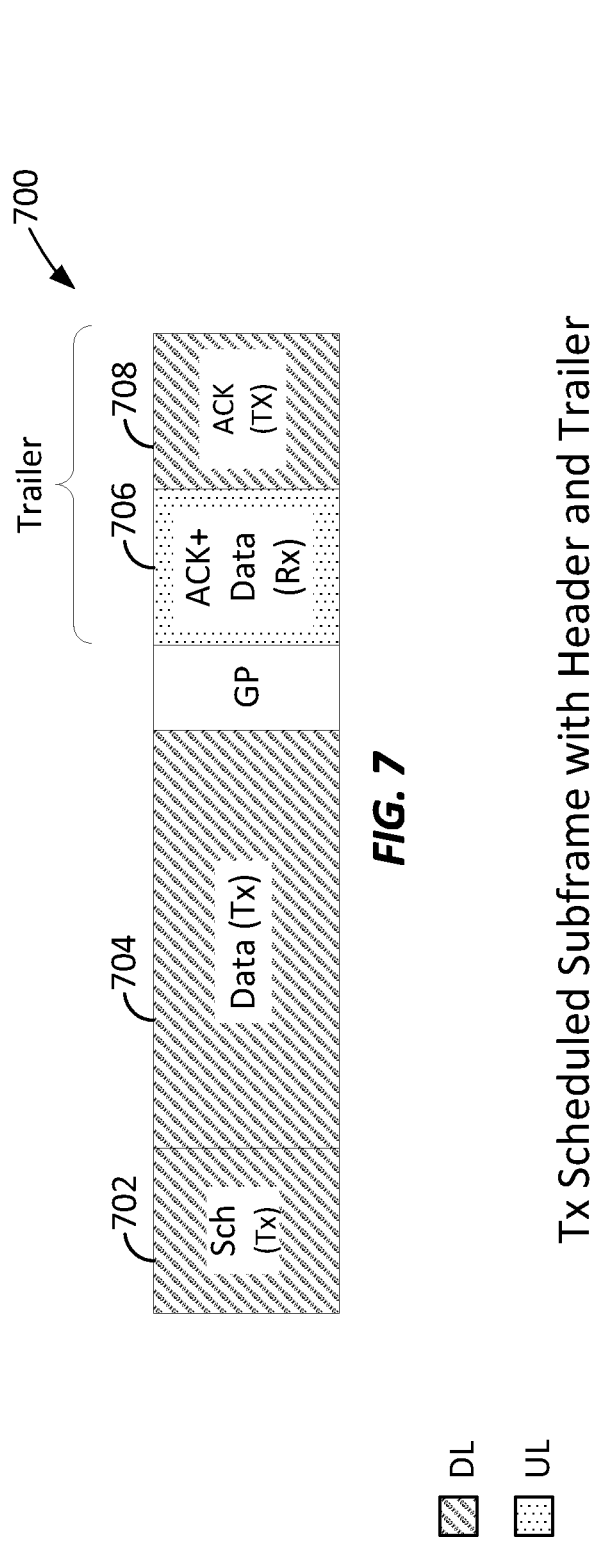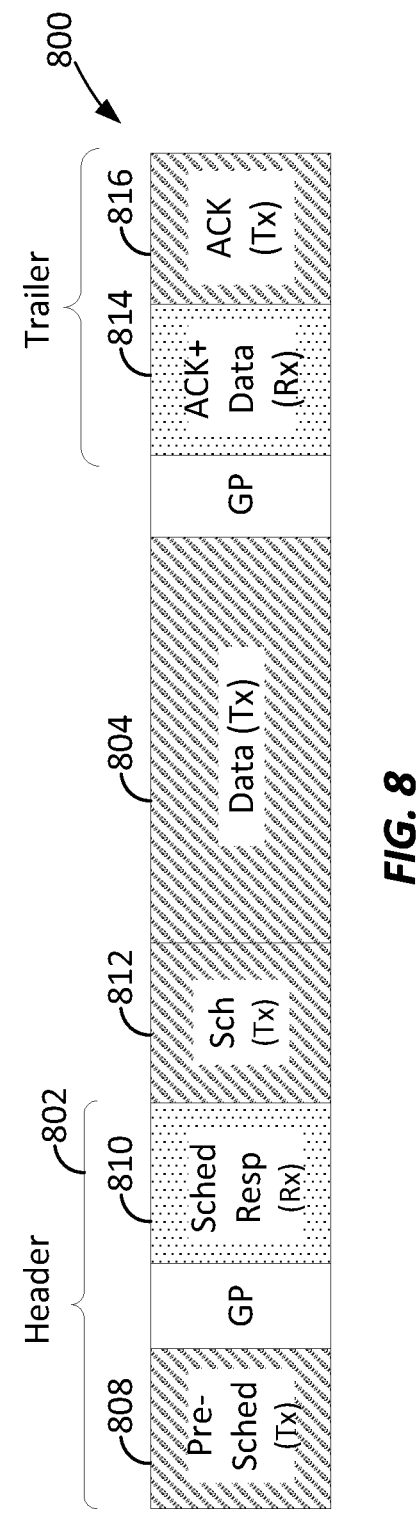
FIG. 7
FIG. 8

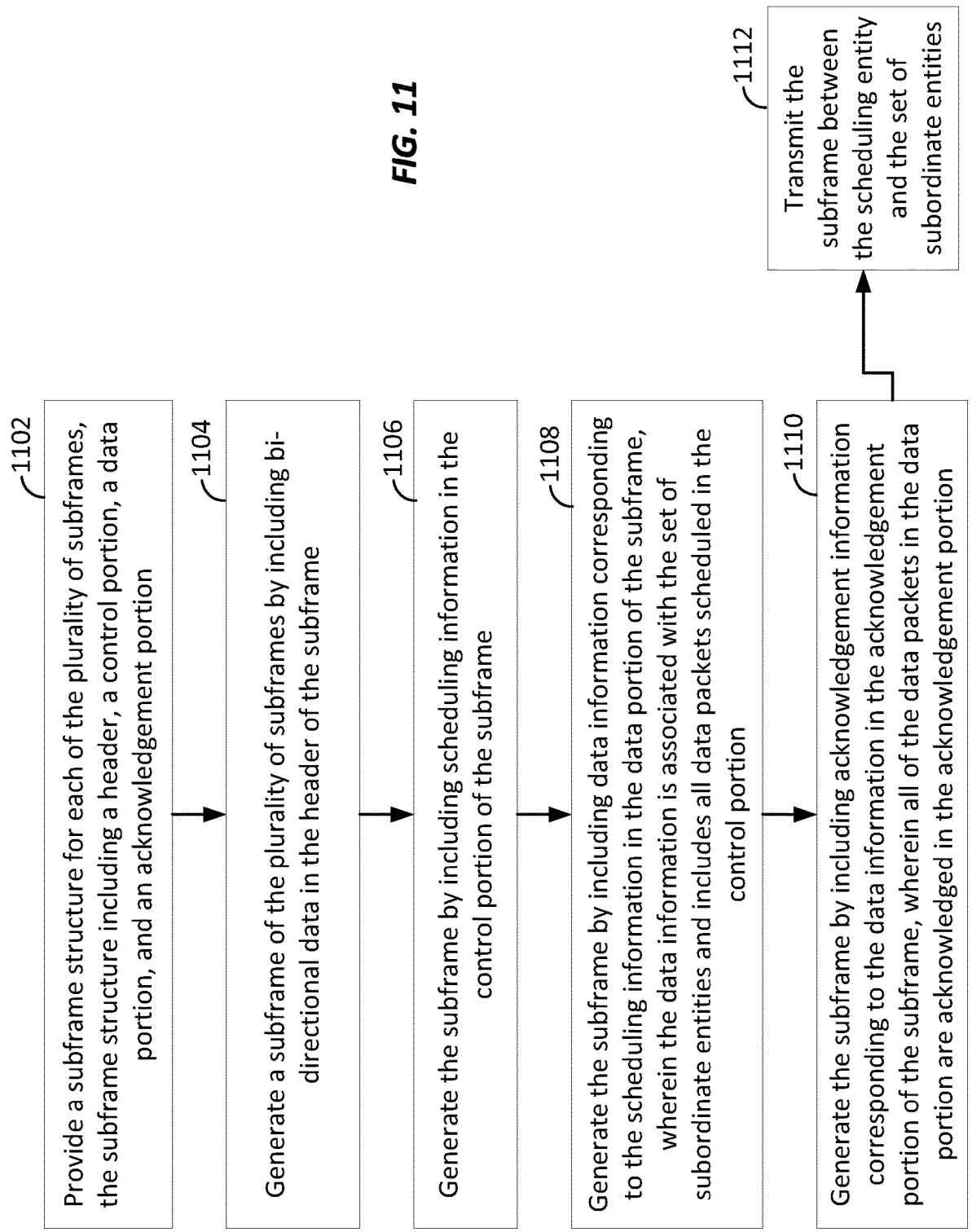

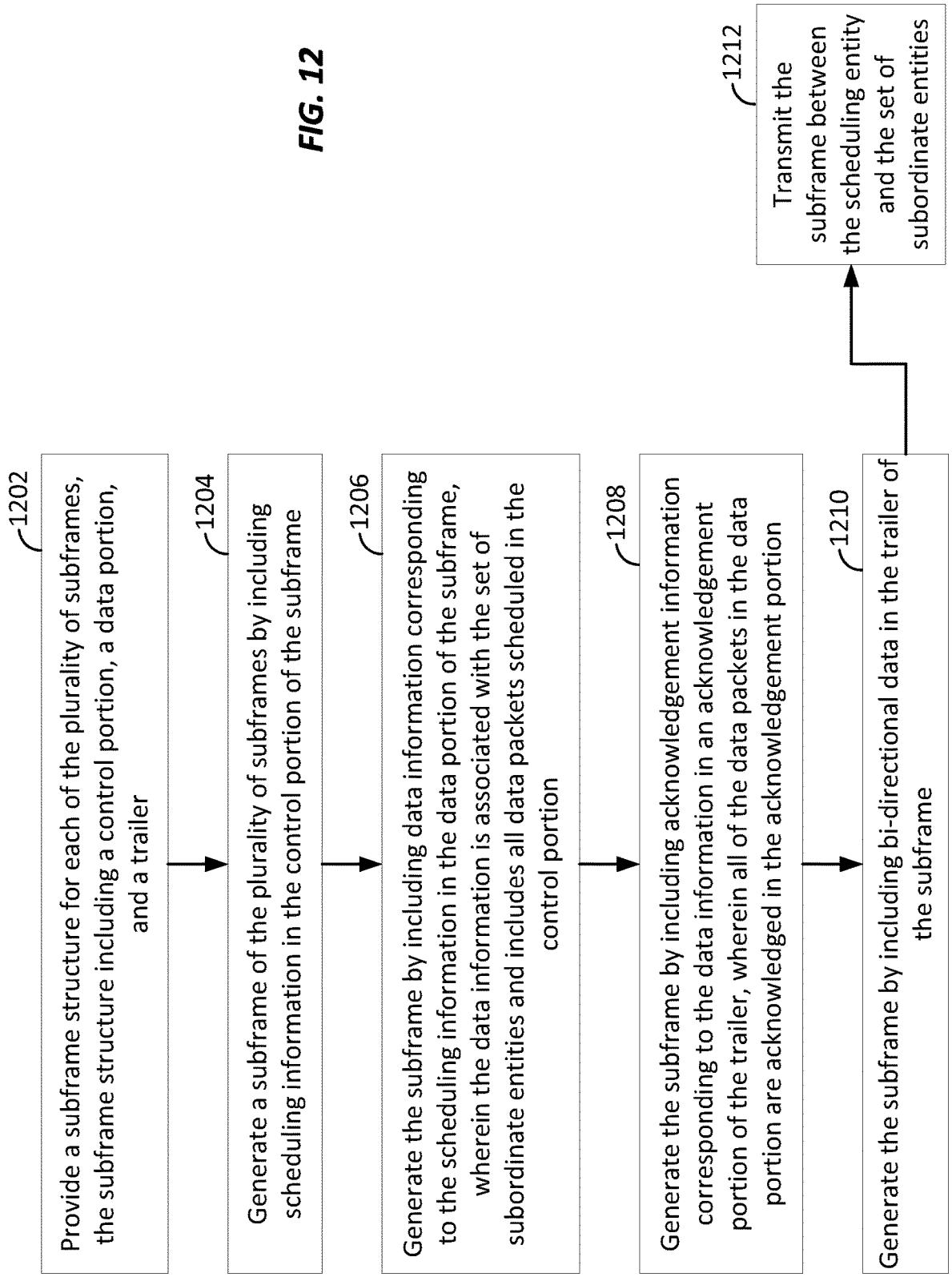

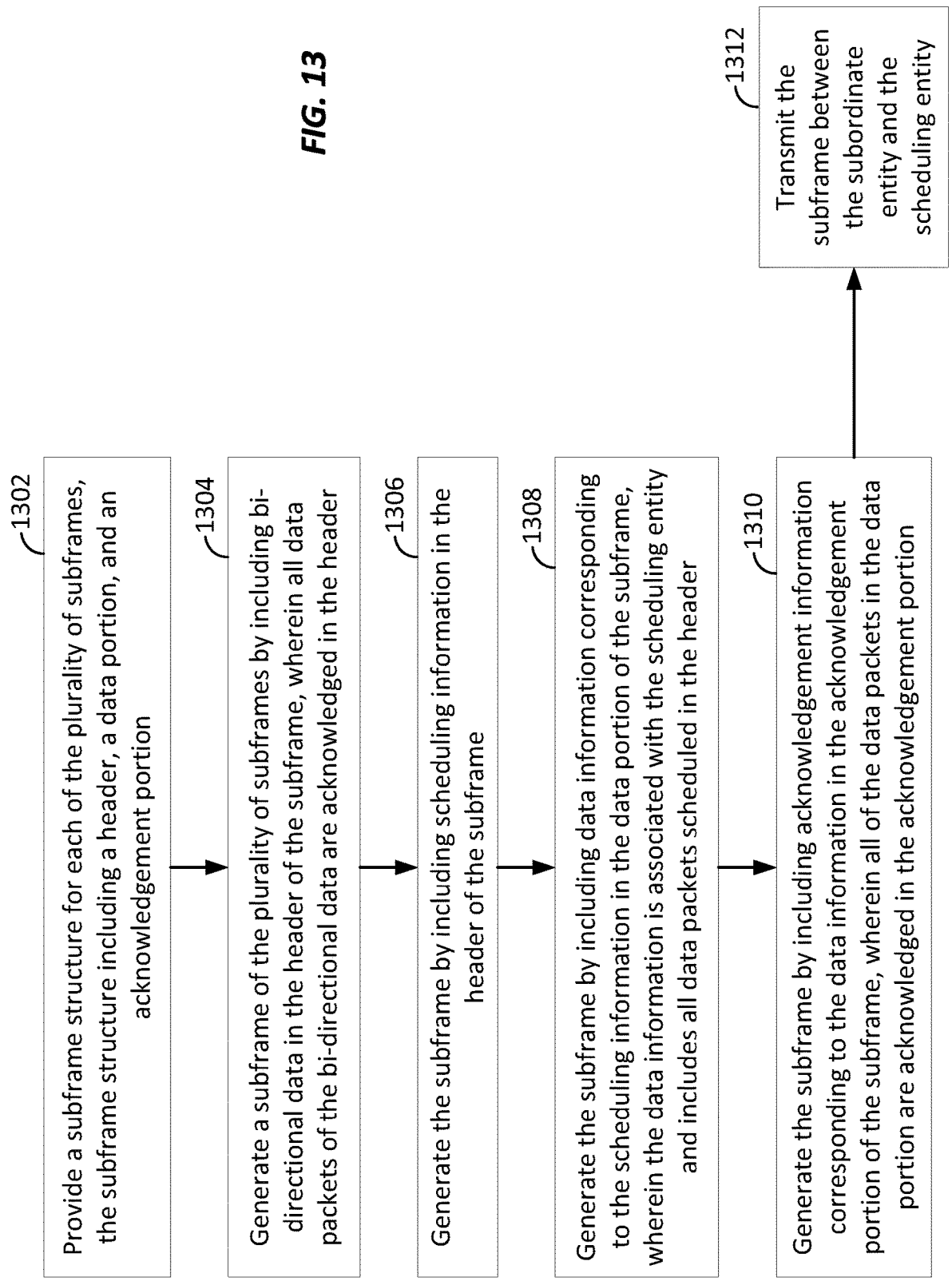

SELF-CONTAINED TIME DIVISION DUPLEX (TDD) SUBFRAME STRUCTURE FOR WIRELESS COMMUNICATIONS

PRIORITY CLAIM

This application is a continuation of patent application Ser. No. 15/821,391 filed in the United States Patent and Trademark Office 22 Nov. 2017, which is a continuation of patent application Ser. No. 14/943,796 filed in the United States Patent and Trademark Office on 17 Nov. 2015, which claims priority to provisional application No. 62/133,390 filed in the United States Patent and Trademark Office on 15 Mar. 2015. The entire content of the prior applications are incorporated herein by reference in their entirety and for all applicable purposes.

TECHNICAL FIELD

Aspects of the present disclosure relate generally to wireless communication systems, and more particularly, to wireless communications utilizing a self-contained time division duplex (TDD) subframe structure.

BACKGROUND

Wireless communications networks are widely deployed to provide various communications services such as telephony, video, data, messaging, broadcasts, and so on. Such networks, which are usually multiple access networks, support communications for multiple users by sharing the available network resources.

The spectrum allocated to such wireless communications networks can include licensed and/or unlicensed spectrum. Licensed spectrum is generally restricted in its use for wireless communications except for licensed use as regulated by a governmental body or other authority within a given region or country. Unlicensed spectrum is generally free to use, within limits, without the purchase or use of such a license. As the use of wireless communications systems continues to increase, the demand for reallocation of additional spectrum for use in many different use cases, including but not limited to telephones, smart phones, PCs, smart meters, remote sensors, smart alarms, mesh nodes, etc.

In many cases, this spectrum is being (or is expected to be) allocated in such a way that paired carriers, utilized in many existing frequency division duplex (FDD) systems, are either not available, or not available in matched bandwidth configurations. Accordingly, time division duplex (TDD) carriers are expected to be utilized in many future deployments for wireless communications systems.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide a self-contained subframe or subframe structure that can be utilized with time division duplex (TDD) carriers. In general, a self-contained subframe includes a set of control/scheduling information, payload data, and corresponding acknowledgment/feedback in the same subframe. Information transmitted on a TDD carrier may be grouped into subframes, and a self-contained subframe may provide communications or data traffic in both directions (e.g., uplink and downlink) in a suitable fashion to enable such communications without needing any further information in another subframe. In some aspects of the disclosure, a self-contained subframe structure may include an extended header portion and/or an extended trailer portion to provide certain additional handshaking and data communications functionality.

One aspect of the disclosure provides a method of wireless communications in a synchronous network for a scheduling entity to communicate with a set of one or more subordinate entities utilizing a time division duplex (TDD) carrier. The scheduling entity may send and/or receive a plurality of subframes through the TDD carrier. The method provides a subframe structure for each of the plurality of subframes, and the subframe structure includes a header, a control portion, a data portion, and an acknowledgement portion. The method generates a subframe of the plurality of subframes by: including bi-directional data in the header of the subframe; including scheduling information in the control portion of the subframe; including data information corresponding to the scheduling information in the data portion of the subframe, and including acknowledgement information corresponding to the data information in the acknowledgement portion of the subframe. The bi-directional data includes data packets from the scheduling entity and the one or more subordinate entities.

In this aspect of the disclosure, the data information is associated with the set of subordinate entities and includes all data packets scheduled in the control portion. All of the data packets in the data portion are acknowledged in the acknowledgement portion. The method further transmits the above-described subframe between the scheduling entity and the set of subordinate entities.

Another aspect of the disclosure provides a method of wireless communications in a synchronous network for a scheduling entity to communicate with a set of one or more subordinate entities utilizing a time division duplex (TDD) carrier. The scheduling entity may send and/or receive a plurality of subframes via the TDD carrier. The method provides a subframe structure for each of the plurality of subframes, and the subframe structure includes a control portion, a data portion, and a trailer. The method generates a subframe of the plurality of subframes by: including scheduling information in the control portion of the subframe; including data information corresponding to the scheduling information in the data portion of the subframe; including acknowledgement information corresponding to the data information in an acknowledgement portion of the trailer; and including bi-directional data in the trailer of the subframe. The bi-directional data includes data packets from the scheduling entity and the one or more subordinate entities.

In this aspect of the disclosure, the data information is associated with the set of subordinate entities and includes all data packets scheduled in the control portion. All of the data packets in the data portion are acknowledged in the acknowledgement portion. The method further transmits the above-described subframe between the scheduling entity and the set of subordinate entities.

Another aspect of the disclosure provides a method of wireless communications in a synchronous network for a subordinate entity to communicate with a scheduling entity utilizing a time division duplex (TDD) carrier. The subordinate entity may send and/or receive a plurality of subframes via the TDD carrier. The method provides a subframe structure for each of the plurality of subframes, and the subframe structure includes a header, a data portion, and an acknowledgement portion. The method generates a subframe of the plurality of subframes by: including bi-directional data in the header of the subframe; including scheduling information in the header of the subframe; including data information corresponding to the scheduling information in the data portion of the subframe; and including acknowledgement information corresponding to the data information in the acknowledgement portion of the subframe. The bi-directional data includes data packets from the scheduling entity and the subordinate entity.

In this aspect of the disclosure, the data information is associated with the scheduling entity and includes all data packets scheduled in the header, and all of the data packets in the data portion are acknowledged in the acknowledgement portion. The method further transmits the subframe between the subordinate entity and the scheduling entity.

Another aspect of the disclosure provides a scheduling entity for wireless communications in a synchronous network. The scheduling entity includes a communication interface configured to communicate with a set of one or more subordinate entities utilizing a time division duplex (TDD) carrier, wherein the TDD carrier includes a plurality of subframes. The scheduling entity further includes a memory including executable code, and a processor operatively coupled with the communication interface and memory.

The processor is configured by the executable code to: provide a subframe structure for each of the plurality of subframes, the subframe structure including a header, a control portion, a data portion, and an acknowledgement portion. The processor is further configured to generate a subframe of the plurality of subframes by: including bi-directional data in the header of the subframe; including scheduling information in the control portion of the subframe; including data information corresponding to the scheduling information in the data portion of the subframe; and including acknowledgement information corresponding to the data information in the acknowledgement portion of the subframe. The bi-directional data includes data packets from the scheduling entity and the one or more subordinate entities.

In this aspect of the disclosure, the data information is associated with the set of subordinate entities and includes all data packets scheduled in the control portion, and all of the data packets in the data portion are acknowledged in the acknowledgement portion. The processor is further configured to transmit, via the communication interface, the above-described subframe between the scheduling entity and the set of subordinate entities.

Another aspect of the disclosure provides a scheduling entity for wireless communications in a synchronous network. The scheduling entity includes a communication interface configured to communicate with a set of one or more subordinate entities utilizing a time division duplex (TDD) carrier, wherein the TDD carrier includes a plurality of subframes. The scheduling entity further includes a memory including executable code, and a processor operatively coupled with the communication interface and memory.

The processor is configured by the executable code to: provide a subframe structure for each of the plurality of subframes, the subframe structure including a control portion, a data portion, and a trailer. The processor is further configured to generate a subframe of the plurality of subframes by: including scheduling information in the control portion of the subframe; including data information corresponding to the scheduling information in the data portion of the subframe; including acknowledgement information corresponding to the data information in an acknowledgement portion of the trailer; and including bi-directional data in the trailer of the subframe. The bi-directional data includes data packets from the scheduling entity and the one or more subordinate entities.

In this aspect of the disclosure, the data information is associated with the set of subordinate entities and includes all data packets scheduled in the control portion, and all of the data packets in the data portion are acknowledged in the acknowledgement portion. The processor is further configured to transmit the above-described subframe between the scheduling entity and the set of subordinate entities.

Another aspect of the disclosure provides a subordinate entity for wireless communications in a synchronous network. The subordinate entity includes a communication interface configured to communicate with a schedule entity utilizing a time division duplex (TDD) carrier, wherein the TDD carrier includes a plurality of subframes. The subordinate entity further includes a memory including executable code; and a processor operatively coupled with the communication interface and memory.

The processor is configured by the executable code to: provide a subframe structure for each of the plurality of subframes, the subframe structure including a header, a data portion, and an acknowledgement portion. The processor is further configured to generate a subframe of the plurality of subframes by: including bi-directional data in the header of the subframe; including scheduling information in the header of the subframe; including data information corresponding to the scheduling information in the data portion of the subframe; and including acknowledgement information corresponding to the data information in the acknowledgement portion of the subframe. The bi-directional data includes data packets from the scheduling entity and the subordinate entity.

In this aspect of the disclosure, the data information is associated with the scheduling entity and includes all data packets scheduled in the header, and all of the data packets in the data portion are acknowledged in the acknowledgement portion. The processor is further configured to transmit the subframe between the subordinate entity and the scheduling entity.

These and other aspects of the present disclosure will become more fully understood upon a review of the detailed description, which follows. Other aspects and features of the present disclosure will become apparent to those of ordinary skill in the art, upon reviewing the following description of specific examples of the present disclosure in conjunction with the accompanying figures. While features of the present disclosure may be discussed relative to certain examples and figures below, all embodiments of the present disclosure can include one or more of the features discussed herein. In other words, while one or more aspects of the disclosure may be discussed as having certain advantageous features, one or more of such features may also be used in accordance with the various aspects of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 7 is a diagram illustrating a Tx-scheduled self-contained subframe with an extended trailer in accordance with an aspect of the disclosure.

FIG. 8 is a diagram illustrating a Tx-scheduled self-contained subframe with an extended header portion and an extended trailer portion in accordance with an aspect of the disclosure.

FIG. 11 is a flow chart illustrating an exemplary method of wireless communication in a synchronous network for a scheduling entity to communicate with a set of one or more subordinate entities in accordance with an aspect of the disclosure.

FIG. 12 is a flow chart illustrating another exemplary method of wireless communication in a synchronous network for a scheduling entity to communicate with a set of one or more subordinate entities in accordance with an aspect of the disclosure.

FIG. 13 is a flow chart illustrating an exemplary method of wireless communication in a synchronous network for a subordinate entity to communicate with a scheduling entity in accordance with an aspect of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
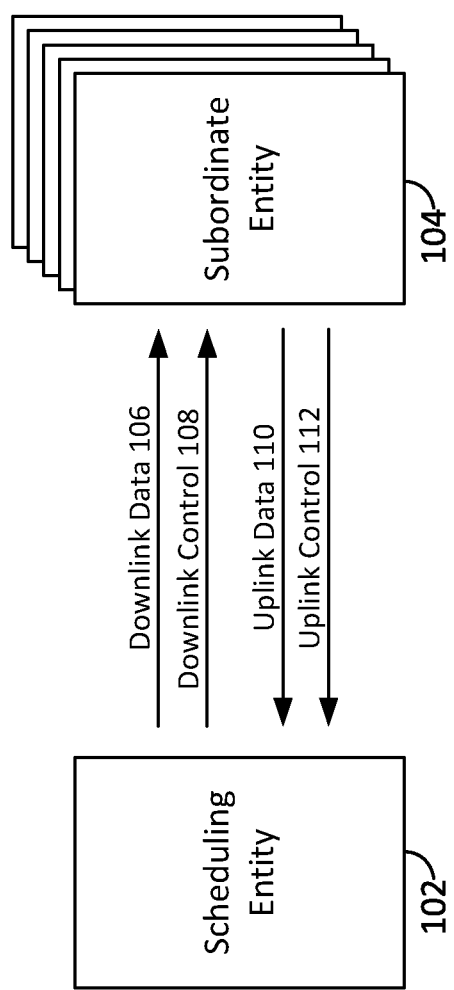
FIG. 1 is a block diagram illustrating an example of a scheduling entity communicating with one or more subordinate entities according to some aspects of the disclosure.

The various concepts presented throughout this disclosure may be implemented across a broad variety of telecommunication systems, network architectures, and communications standards. In order to illustrate some of the entities or devices described throughout the present disclosure, FIG. 1 is a block diagram illustrating an exemplary scheduling entity 102 in wireless communications with one or more subordinate entities 104. The scheduling entity transmits downlink (DL) data channel(s) 106 and downlink control channel(s) 108, while the subordinate entities 104 transmit uplink (UL) data channel(s) 110 and uplink control channel(s) 112. Of course, the channels illustrated in FIG. 1 are not necessarily all of the channels that may be utilized between a scheduling entity 102 and subordinate entities 104, and those of ordinary skill in the art will recognize that other channels may be utilized in addition to those illustrated, such as other data, control, acknowledgment and feedback channels. A UL or DL data channel may correspond to one or more frequency carriers. For a certain data transmission, the transmitter is the Tx node, and the receiver is the Rx node.

In some aspects of the disclosure, the scheduling entity 102 may be a base station or access point, or a user equipment (UE) in a device-to-device (D2D) and/or mesh network. The scheduling entity 102 manages the resources on the channel or carrier and assigns resources to other users of the channel, including subordinate entities, such as one or more UEs in a cellular network. The scheduling entities 102 are responsible for all radio related functions including radio bearer control, admission control, mobility control, scheduling, security, and connectivity to a centralized controller and/or gateway. There is no centralized controller shown in the example of FIG. 1, but a centralized controller may be used in alternative configurations.

The size of data transferred between a scheduling entity 102 and a subordinate entity 104 may by defined by a transmission time interval (TTI). A TTI is the duration of a subframe. Throughout this disclosure, a self-contained subframe includes at least the scheduling control info, the user data, and the acknowledgment or feedback for the user data. A frame is a collection of subframes, and frames may be utilized by upper layers for various purposes such as synchronization, acquisition, application layer controls, etc.

As illustrated in FIG. 1, the scheduling entity 102 may broadcast downlink data 106 to one or more subordinate entities 104. In accordance with aspects of the present disclosure, the term downlink (DL) may refer to a point-to-multipoint transmission originating at the scheduling entity 102. Broadly, the scheduling entity 102 is a node or device responsible for scheduling traffic in a wireless communications network, including the downlink transmissions and, in some examples, uplink data 110 from one or more subordinate entities 104 to the scheduling entity 102. (Another way to describe the scheme may be to use the term broadcast channel multiplexing.) A scheduling entity may be, or may reside within, a base station, a network node, a user equipment (UE), an access terminal, a peer, a mesh node, or any suitable node in a wireless communication network. Some devices may be configured to be a scheduling entity and subordinate entity simultaneously or during different time periods.

In accordance with aspects of the present disclosure, the term uplink (UL) may refer to a point-to-point transmission originating at a subordinate entity 104. Broadly, the subordinate entity 104 is a node or device that receives scheduling control information, including but not limited to scheduling grants, synchronization or timing information, frequency information, or other control information from another entity (e.g., scheduling entity) in the wireless communications network such as the scheduling entity 102. A subordinate entity may be, or may reside within, a base station, a network node, a UE, an access terminal, a peer, a mesh node, or any suitable node in a wireless communications network. In some aspects of the disclosure, the scheduling entity 102 and the subordinate entity 104 may communicate with each other via one or more time division duplex (TDD) carriers.

Figure 2:
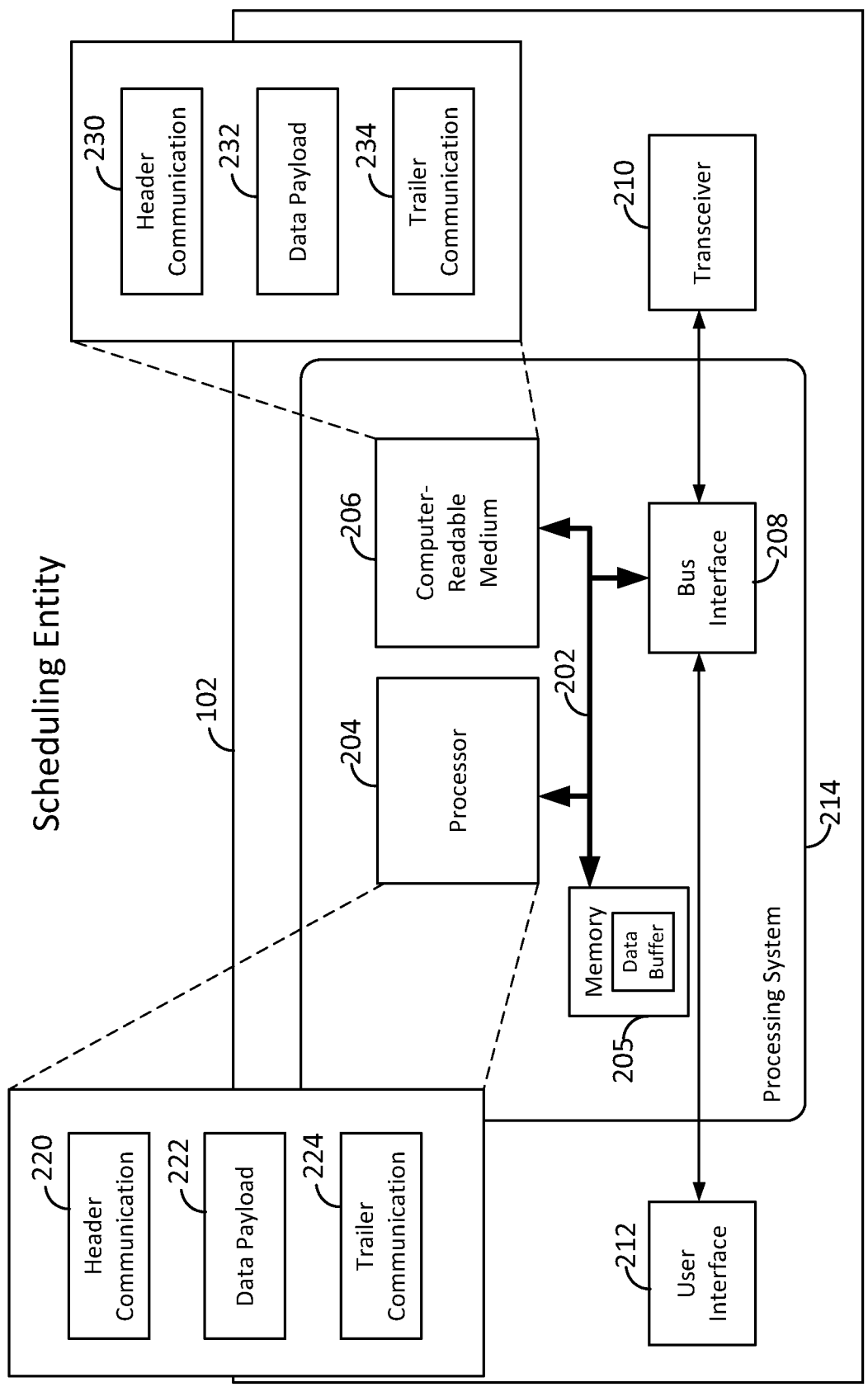
FIG. 2 is a block diagram illustrating an example of a hardware implementation of a scheduling entity employing a processing system according to some aspects of the disclosure.

FIG. 2 is a diagram illustrating an example of a hardware implementation of a scheduling entity 102 employing a processing system 214. In accordance with various aspects of the disclosure, an element, or any portion of an element, or any combination of elements may be implemented with a processing system 214 that includes one or more processors 204.

In various aspects of the disclosure, the scheduling entity 102 may be any suitable radio transceiver apparatus, and in some examples, may be embodied by a base station (BS), a base transceiver station (BTS), a radio base station, a radio transceiver, a transceiver function, a basic service set (BSS), an extended service set (ESS), an access point (AP), a Node B, an eNode B (eNB), mesh node, a device-to-device (D2D) node, relay, or some other suitable terminology. Within the present document, a base station may be called a scheduling entity, indicating that the base station provides scheduling information to one or more subordinate entities (e.g., UEs).

In other examples, the scheduling entity 102 may be embodied by a wireless user equipment (UE). Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc., an appliance, a sensor, a vending machine, or any other similar functioning device. The UE may also be called by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a UE may be either be a scheduling entity or a subordinate entity or both. That is, in various aspects of the present disclosure, a wireless UE may operate as a scheduling entity providing scheduling information to one or more subordinate entities, or may operate as a subordinate entity, operating in accordance with scheduling information provided by a scheduling entity.

Examples of processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 204, as utilized in an apparatus 200, may be used to implement any one or more of the processes described below in FIGS. 9 and 10.

In this example, the processing system 214 may be implemented with a bus architecture, represented generally by the bus 202. The bus 202 may include any number of interconnecting buses and bridges depending on the specific application of the processing system 214 and the overall design constraints. The bus 202 links together various circuits including one or more processors (represented generally by the processor 204), a memory 205, and computer-readable media (represented generally by the computer-readable medium 206). The bus 202 may also link various other circuits such as timing sources, peripherals, voltage regulators, and power management circuits, which are well known in the art, and therefore, will not be described any further. A bus interface 208 provides an interface between the bus 202 and a transceiver 210. The transceiver 210 provides a means for communicating with various other apparatus over a transmission medium. For examples, the transceiver 201 may include one or more transmitters and receivers configured to communicate with one or more radio access technologies. Depending upon the nature of the apparatus, a user interface 212 (e.g., keypad, display, speaker, microphone, joystick, touchscreen) may also be provided.

The processor 204 may include a header communications block 220, a data payload block 222, and a trailer communications block 224. In one aspect of the disclosure, the header communications block 220, data payload block 222, and trailer communications block 224 may be configured by TDD communications code stored at the computer-readable medium 206 to perform TDD communications utilizing the self-contained subframe structures illustrated in FIGS. 6-8 and 10.

In one aspect of the disclosure, the header communications block 220 may be configured to utilize a header of a subframe for wireless communications with one or more subordinate entities 104. For example, the header portion may have an uplink portion and a downlink portion for exchanging information, for example, one or more channel parameters. The data payload block 222 may be configured to utilize a data portion of the subframe for wireless communications with one or more subordinate entities 104. The data portion may carry data or information communicated in accordance with the information carried in the header portion of the subframe. The trailer communications block 224 may be configured to utilize a trailer of the subframe for wireless communications with one or more subordinate entities 104.

The processor 204 is responsible for managing the bus 202 and general processing, including the execution of software stored on the computer-readable medium 206. The software, when executed by the processor 204, causes the processing system 214 to perform the various functions described below in FIGS. 11 and 12 for any particular apparatus. The computer-readable medium 206 may include a header communications code 230 for configuring the header communications block 220. The computer-readable medium 206 may include a data payload code 232 for configuring the data payload block 222. The computer-readable medium 206 may include a trailer communications code 234 for configuring the trailer communications block 224. The computer-readable medium 206 may also be used for storing data that is manipulated by the processor 204 when executing software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 3:
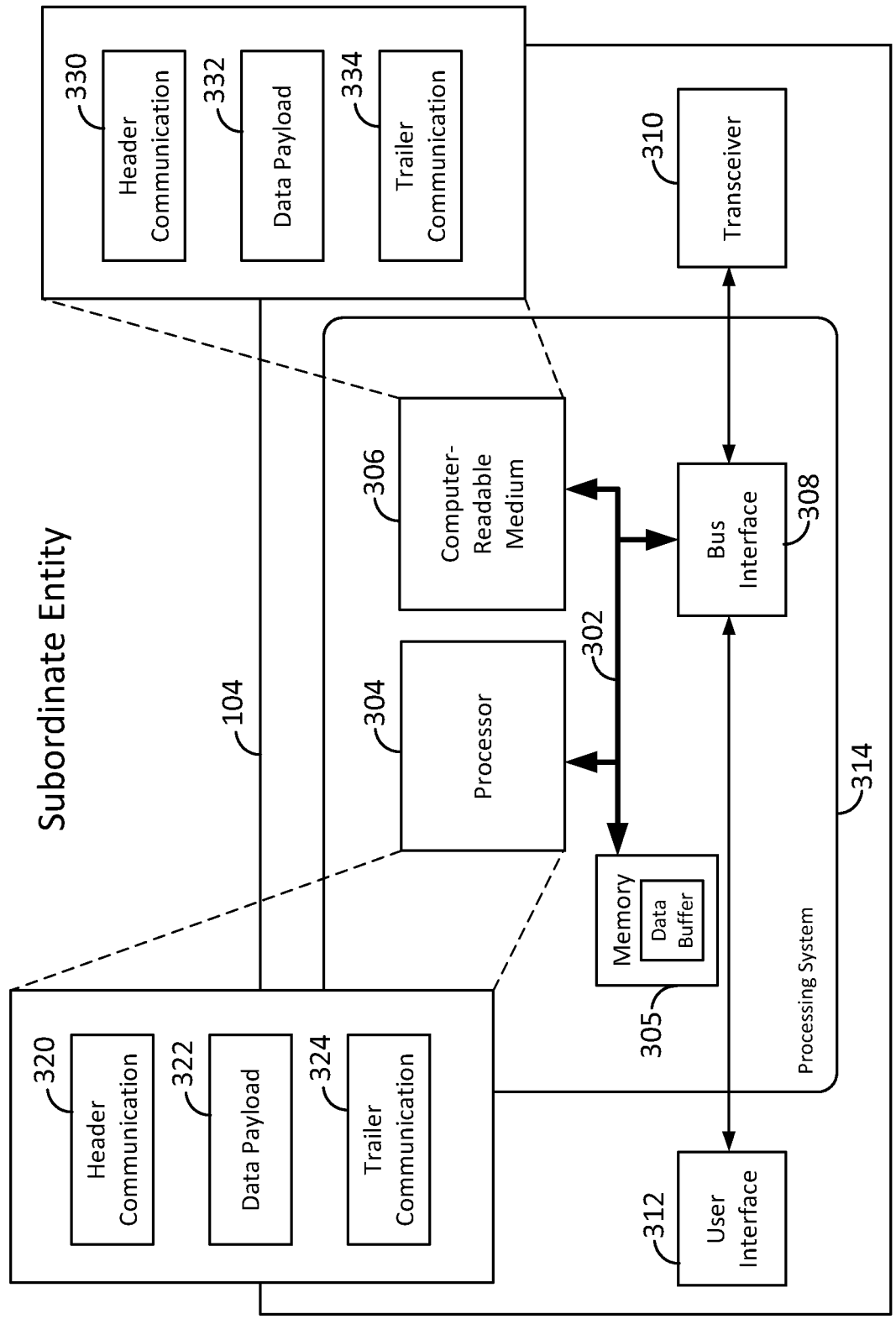
FIG. 3 is a block diagram illustrating an example of a hardware implementation of a subordinate entity employing a processing system according to some aspects of the disclosure.

FIG. 3 is a diagram illustrating an example of a hardware implementation for an exemplary subordinate entity 104 employing a processing system 314. In accordance with various aspects of the disclosure, an element, or any portion of an element, or any combination of elements may be implemented with a processing system 314 that includes one or more processors 304.

The processing system 314 may be substantially the same as the processing system 214 illustrated in FIG. 2, including a bus interface 308, a bus 302, memory 305, a processor 304, and a computer-readable medium 306. Furthermore, the processing system 314 may include a user interface 312 and one or more transceivers 310 substantially similar to those described above in FIG. 2. The processor 304, as utilized in a subordinate entity 104, may be used to implement any one or more of the processes described below for example in FIGS. 11 and 12.

In one aspect of the disclosure, the processor 304 may include a header communications block 320, a data payload block 322, and a trailer communications block 324. The header communications block 320, data payload block 322, and trailer communications block 324 may be configured by TDD communications code stored at the computer-readable medium 306 to perform TDD communications utilizing the self-contained subframe structures illustrated in FIGS. 6-8 and 10.

The header communications block 320 may be configured to utilize a header of a subframe for wireless communications with a scheduling entity 102. For example, the header may have an uplink portion and a downlink portion for exchanging information about one or more channel parameters. The data payload block 322 may be configured to utilize a data portion of the subframe for wireless communications with the scheduling entity 102. The data portion may carry data or information communicated in accordance with the information carried in the header of the subframe. The trailer communications block 324 may be configured to utilize a trailer of the subframe for wireless communications with the scheduling entity 102. The computer-readable medium 306 may include a header communications code 330 for configuring the header communications block 320. The computer-readable medium 306 may include a data payload code 332 for configuring the data payload block 322. The computer-readable medium 306 may include a trailer communications code 334 for configuring the trailer communications block 324.

Those of ordinary skill in the art will readily understand that communication utilizing a TDD carrier has certain drawbacks. For example, full-duplex communication is only achieved at a relatively long timescale. At very short timescales, within the range of the duration of subframes, communication in only one direction at a time is available on the TDD carrier. That is, while a device is transmitting a symbol, its receiver may be disabled and it is generally unable to receive a symbol. Similarly, while a device is receiving a symbol, its transmitter may be disabled, and it is generally unable to transmit a symbol.

Figure 4:
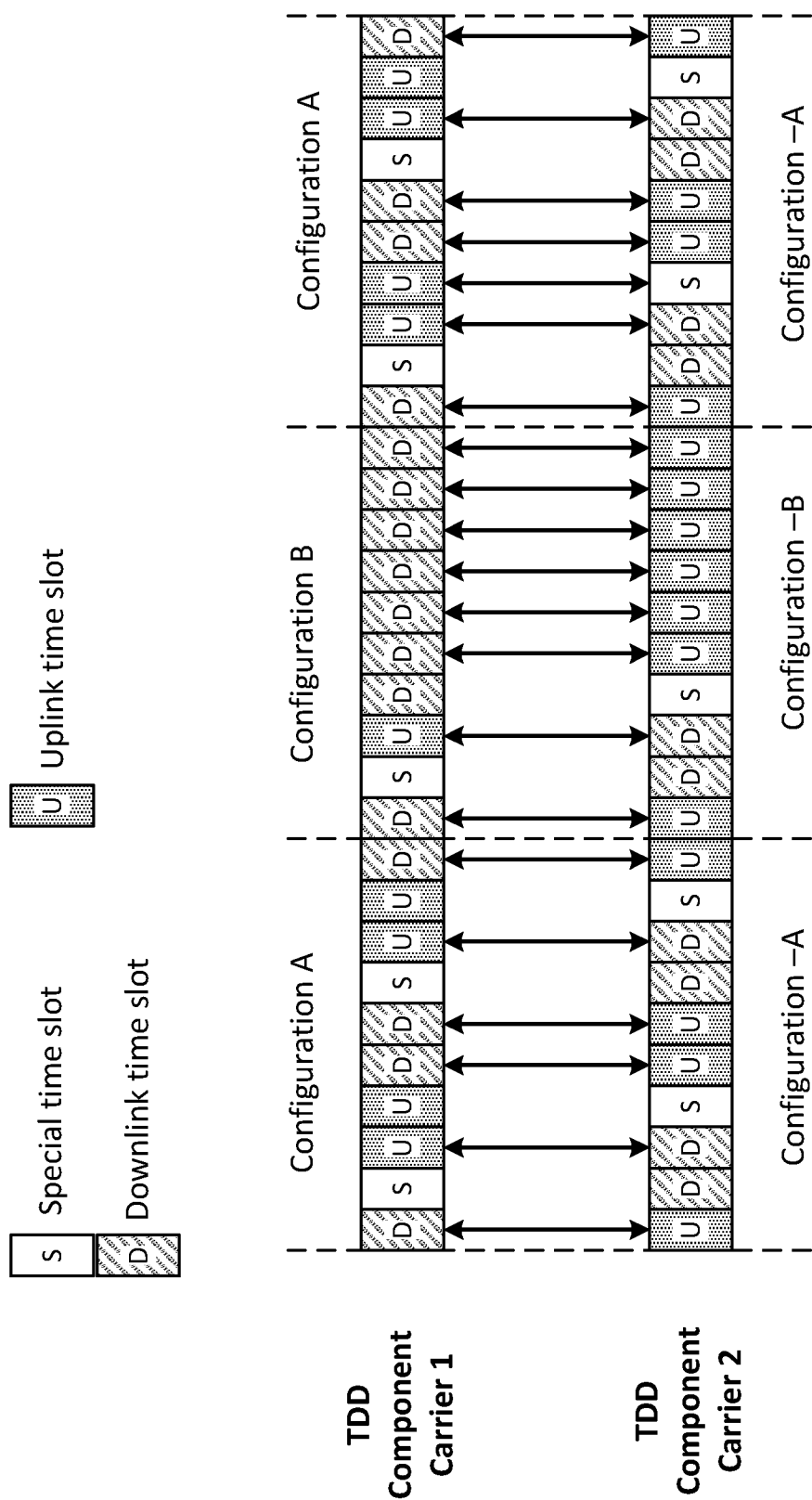
FIG. 4 is a schematic diagram illustrating inverse (conjugate) pairing of time division duplex carriers according to one aspect of the disclosure.

One way to overcome this issue is to pair two TDD carriers with one another in a way that can enable full duplex communication. FIG. 4 illustrates one example of a pairing of two TDD component carriers (CC). In this illustration, a first CC (component carrier 1 or CC1) is paired with a second CC (component carrier 2 or CC2). The horizontal axis represents time, and the vertical axis represents frequency (not to scale). Both CC1 and CC2 are TDD carriers, wherein uplink time slots, indicated with a U, are time-multiplexed with downlink time slots, indicated with a D on each respective carrier. Additionally, some time slots are identified as special time slots, and indicated with an S, described further below. Herein, a time slot may correspond to any suitable duration of time, and may correspond to other nomenclature such as a transmission time interval (TTI), subframe, frame, symbol duration, etc.

If only CC1 or CC2 were usable by a communications device, it is seen that only downlink, uplink, or special time slots exist at any single time. The illustration shows two different types of subframes, identified as Configuration A and Configuration B. In the first subframe, identified as Configuration A, there is the same number of uplink time slots U and downlink time slots D, with two of the time slots identified as special time slots S. In the second subframe, identified as Configuration B, most of the time slots are downlink time slots D, with one uplink time slot U and one special time slot S. The third subframe is shown as another Configuration A subframe. These configurations are merely one example, which corresponds to some existing configurations defined in TD-LTE standards.

At any moment, for example, during the second frame identified as Configuration B, if the communications device (e.g., a scheduling device or subordinate device) has a need to send feedback or information on the uplink, it may not be presented with such an opportunity, because it is faced with a long stretch of downlink-only time slots. Here, without the availability of the paired component carrier (e.g., CC2), the feedback would need to be buffered at least until the next opportunity is presented in the third time slot of the third subframe in the example shown in FIG. 4.

Therefore, the first TDD component carrier CC1 may be paired with a second TDD component carrier CC2. Here, CC2 may implement an inverse, conjugate, or complementary transmit/receive organization relative to that of CC1. In the present disclosure, the terms inverse, complementary, and conjugate are utilized interchangeably, generally referring to a configuration wherein at least some of the downlink time slots D in CC1 are paired with uplink time slots U in CC2, and at least some of the uplink time slots U in CC1 are paired with downlink time slots D in CC2. The configuration illustrated is merely exemplary in nature, and other configurations may be utilized within the scope of the present disclosure, some of which may pair all time slots across the two component carriers, and others of which may include some unpaired uplink/downlink time slots.

As shown, the Configuration A subframe is paired with a Configuration −A subframe, wherein Configuration −A represents the inverse (or conjugate) of Configuration A. Likewise, the Configuration B subframe is paired with a Configuration −B subframe.

The special time slot, indicated with the S symbol, in the illustrated example may be utilized for downlink-to-uplink switching. That is, with reference to communications by a subordinate entity 104, when utilizing a TDD carrier, where the timing for both the uplink and downlink transmissions is driven by a scheduling entity 102, there may be a need for a certain time gap when transitioning from a downlink time slot D and an uplink time slot U. That is, there is a certain propagation delay between the transmission of the downlink time slot D from the scheduling entity 102 to the subordinate entity 104, as well as between the transmission of the uplink time slot U from the subordinate entity 104 to the scheduling entity 102. To account for these propagation delays, special time slots S insert a gap between the end of a downlink time slot D and the beginning of an uplink time slot U, so that the scheduling entity 102 and the subordinate entity 104 can maintain synchronization. Here, the gap may correspond to a time when neither uplink nor downlink communications occur. The length of the gap (or guard period) in the special time slot S can be configured in accordance with the size of the cell or other design factors.

In various aspects of the disclosure, the special time slots S in one component carrier can be paired with any suitable time slot on its paired component carrier, including a downlink time slot D, an uplink time slot U, or another special time slot S. In some examples, such as the illustrated example in FIG. 4, each of the special time slots S in one component carrier (CC1) may be mapped (e.g., time-aligned) to a respective downlink time slot in its paired component carrier (CC2). However, this is merely one example, and is not intended to be limiting in nature.

In a further example, special time slots S may be inserted in the inverse or paired component carrier CC2 as needed, in between transitions from downlink time slots to uplink time slots.

The illustration in FIG. 4 shows, as one example, two paired TDD component carriers having essentially the same bandwidth. That is, each component carrier has the same width in the vertical frequency dimension. However, this is merely one example, and in another example, a first TDD component carrier, CC1, may have a wider bandwidth (e.g., 100 MHz) than the other component carrier. This component carrier may be paired with a second TDD component carrier, CC2, having a narrow bandwidth (e.g., 10 MHz). The choice of the ratio between the carriers' respective bandwidths may be made in accordance with characteristics of the traffic being carried on the uplink and downlink, such as the degree of asymmetry between uplink and downlink traffic. For example, traffic that is substantially heavier on the downlink side could be accommodated by deploying a larger number of downlink time slots on the wider bandwidth component carrier.

However, the pairing of component carriers as described above may not always be an option. Even in such unpaired use cases, flexibility in the provision of scheduling, data, and feedback for bi-directional communications utilizing a TDD carrier may be desired.

According to some aspects of the present disclosure, apparatus, methods, and computer instructions are disclosed, utilizing a self-contained subframe structure for wireless communication. In some aspects of the disclosure, the self-contained subframe structure may be a TDD subframe that may be utilized for transmitter-scheduled (Tx-scheduled) transmission. In the present disclosure, a Tx-scheduled subframe may also be called a downlink-centric (DL-centric) subframe. In one example, the Tx-scheduled subframe is configured based on the assumption that a scheduling entity 102 is scheduled to transmit data (e.g., DL data) on a data channel (e.g., DL channel) to one or more subordinate entities 104. In this example, the scheduling entity 102 is a Tx node, and the subordinate entity 104 is an Rx node.

A self-contained subframe may be full and comprehensive in and of itself. That is, the self-contained subframe may provide control and scheduling information for all of the user data within the same subframe. Also, the self-contained subframe may include acknowledgement/feedback for all of the user data within that subframe. Thus, all of the user data packets may be acknowledged prior to the next scheduling instance. In other words, no further scheduling/control for user data packets will occur until all prior-scheduled user data packets have been acknowledged.

Figure 5:
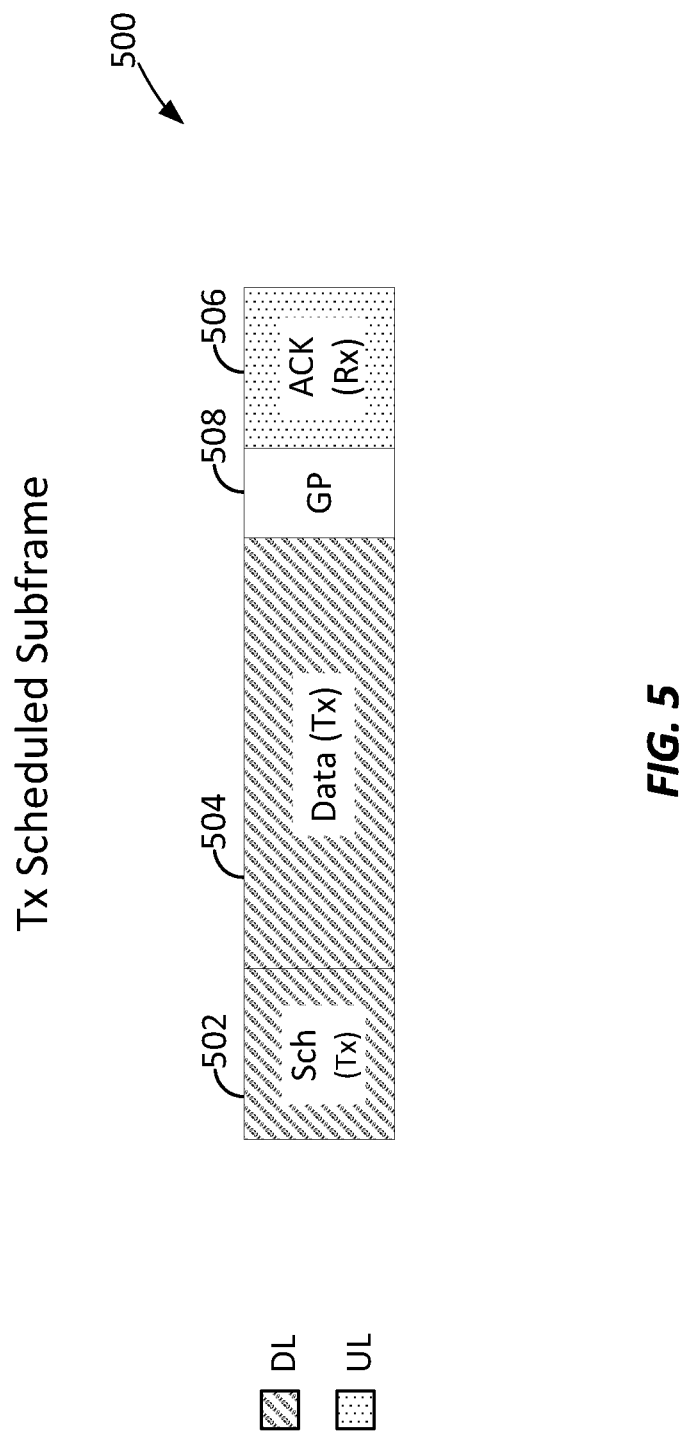
FIG. 5 is a diagram illustrating an example of a Tx-scheduled self-contained subframe in accordance with an aspect of the disclosure.

FIG. 5 illustrates an exemplary self-contained subframe 500 in accordance with an aspect of the disclosure. The self-contained subframe 500 may be a TDD self-contained subframe and have a fixed duration (t), but may also have a duration that is configurable and determined during network deployment and/or may be updated through system messages. In one example, the duration of the self-contained subframe 500 may be 500 µs.

The self-contained subframe structure shown in FIG. 5 may be a transmitter-scheduled (Tx-scheduled) subframe, also called a downlink TTI subframe or DL-centric subframe. A scheduling entity 102 may utilize the DL-centric subframe 500 to carry control and/or data information to a subordinate entity 104, which may be a UE for example. The scheduling entity may also receive data or acknowledgement information from the subordinate entity within the same subframe. Thus, each DL-centric subframe includes both DL transmissions and UL transmissions and is divided with respect to time (t) into DL transmission and UL transmission portions or fields.

In the example shown in FIG. 5, the DL transmission portions include a control portion 502 and a data portion 504, and the UL transmission portion includes an acknowledgement portion 506. Therefore, within the subframe structure 500, the scheduling entity has an opportunity to transmit control information and/or scheduling information in the control portion 502, and then an opportunity to transmit data information to one or more subordinate entities in the DL data portion 504 using at least one of time division multiplexing, frequency division multiplexing, code division multiplexing, or any other suitable multiplexing scheme. The control portion 502 may also be called a scheduling portion. Following a guard period (GP) portion 508, the scheduling entity has an opportunity to receive an acknowledgment of all the DL data in the acknowledgement portion 506 from one or more subordinate entities within the same subframe. The acknowledgment may be an acknowledged (ACK) signal or a not-acknowledged (NACK) signal. The acknowledgement portion 506 may also be called a feedback field. Thus, all of the data packets transmitted within the subframe 500 may be acknowledged as received successfully or in error within the same subframe 500. This subframe structure 500 is downlink-centric, as more resources are allocated for transmissions in the downlink direction (e.g., transmissions from the scheduling entity) than for transmissions in the uplink direction (e.g., transmissions from the subordinate entities).

In one example, the control portion 502 may be used to transmit a physical downlink control channel (PDCCH) indicating time-frequency assignments of data packets intended for one or more subordinate entities, and the data portion 504 may be used to transmit or communicate a data payload or information (e.g., DL data) including the data packets intended for the one or more subordinate entities within the assigned time-frequency slots. For example, the data information may include all the data packets scheduled in the control portion 502. Thus, each subordinate entity that is scheduled to receive data in the data portion 504 of the subframe 500 may be individually addressed in the control portion 502 of the subframe 500, so that the subordinate entities can correctly receive and process the corresponding downlink data packets. Following the GP portion 508, the scheduling entity may receive an acknowledgment (e.g., ACK or NACK signal) or other feedback during the acknowledgement portion 506 from each subordinate entity that received data packets during the data portion 504, to indicate whether the data packets were successfully received or not. Thus, all of the data packets transmitted within the subframe 500 may be acknowledged (e.g., ACK or NACK) within the same subframe.

In other examples, the control portion 502 may be utilized to transmit or communicate other downlink control channels, such as the Physical Broadcast Channel (PBCH), and other downlink pilots, such as the channel-state information-reference signal (CSI-RS). These additional downlink channels and/or pilots, along with any other downlink control information, may be transmitted together with the PDCCH within the control portion 502. In addition, the acknowledgement portion 506 may also be used to transmit other uplink control channels and information, such as the physical uplink control channel (PUCCH), random access channel (RACH), scheduling request (SR), sounding reference signal (SRS), channel quality indicator (CQI), channel state feedback information, and buffer status. Broadly, any suitable transmission in the UL direction may be made complementary to the ACK/NACK and other information described above within the acknowledgement portion 506.

In an aspect of the disclosure, the data portion 504 may be used to multiplex data transmissions to a set of subordinate entities (i.e., two or more subordinate entities) within the subframe 500. For example, the scheduling entity may multiplex downlink data to the set of subordinate entities using time division multiplexing (TDM), frequency division multiplexing (FDM) (i.e., OFDM), code division multiplexing (CDM), and/or any other suitable multiplexing scheme. Thus, the DL data portion 504 may include data for multiple users and up to a high order of multi-user MIMO. In addition, the control portion 502 and acknowledgement portion 506 may also be used to multiplex control information to or from a set of subordinate entities in a TDM, FDM, CDM, and/or other suitable manner.

The GP portion 508 may be scheduled to accommodate variability in UL and DL timing. For example, latencies due to RF antenna direction switching (e.g., from DL to UL) and transmission path latencies may cause the subordinate entity to transmit early on the UL to match DL timing. Such early transmission may interfere with symbols received from the scheduling entity. Accordingly, the GP portion 508 may insert a suitable amount of time after the DL data portion 504 to prevent or reduce interference, where the GP portion 508 may provide an appropriate amount of time for the scheduling entity to switch its RF antenna direction (between Tx and Rx) including settling time for phase-locked loops (PLLs), filters and amplifiers, for the over-the-air (OTA) transmission time, and time for acknowledgment processing by the subordinate entity. The GP portion 508 may further provide an appropriate amount of time for the subordinate entity to switch its RF antenna direction (e.g., from DL to UL), to process the data payload, and for the over-the-air (OTA) transmission time.

The duration of the GP portion 508 may be configurable based on, for example, the cell size and/or processing time requirements. For example, the GP portion 508 may have a duration of one symbol period (e.g., 31.25 µs). However, in accordance with some aspects of the disclosure, the switch point from DL to UL transmissions may be deterministic throughout the network. Thus, although the beginning point of the GP portion 508 may be variable and configurable, the ending point of the GP portion 508 corresponding to the switch point from DL to UL may be fixed by the network to manage interference between DL and UL transmissions. In an aspect of the disclosure, the switch point may be updated or adjusted by the network or scheduling entity in a semi-static manner and indicated in the PDCCH. In addition, the GP duration and/or beginning point of the GP portion 508 may also be indicated in the PDCCH.

In networks utilizing unlicensed spectrum, the switch point may be maintained at a deterministic location, common to different cells. In scenarios in which the amount of data to be transmitted is less than that allocated to the data portion 504, to avoid losing access to the TDD carrier, the data portion 504 of the subframe 500 can be filled or padded by either extending the transmission to occupy only a portion of the frequency band or filling in the transmission with pilots or other filler symbols.

In some aspects of the disclosure, the subframe 500 may additionally include a header portion and/or a trailer portion to provide additional functionality as described in the examples below in relation to FIGS. 6-8. In some examples, a header portion may include a pre-scheduling field and a corresponding scheduling response field, which may be utilized for a variety of bi-directional communications purposes. In other examples, a trailer may include bi-directional traffic portions for additional acknowledgment functionality (e.g., ACK/NACK) and data communications for a variety of purposes. The bi-directional data may include data packets originated from a scheduling entity and one or more subordinate entities.

Figure 6:
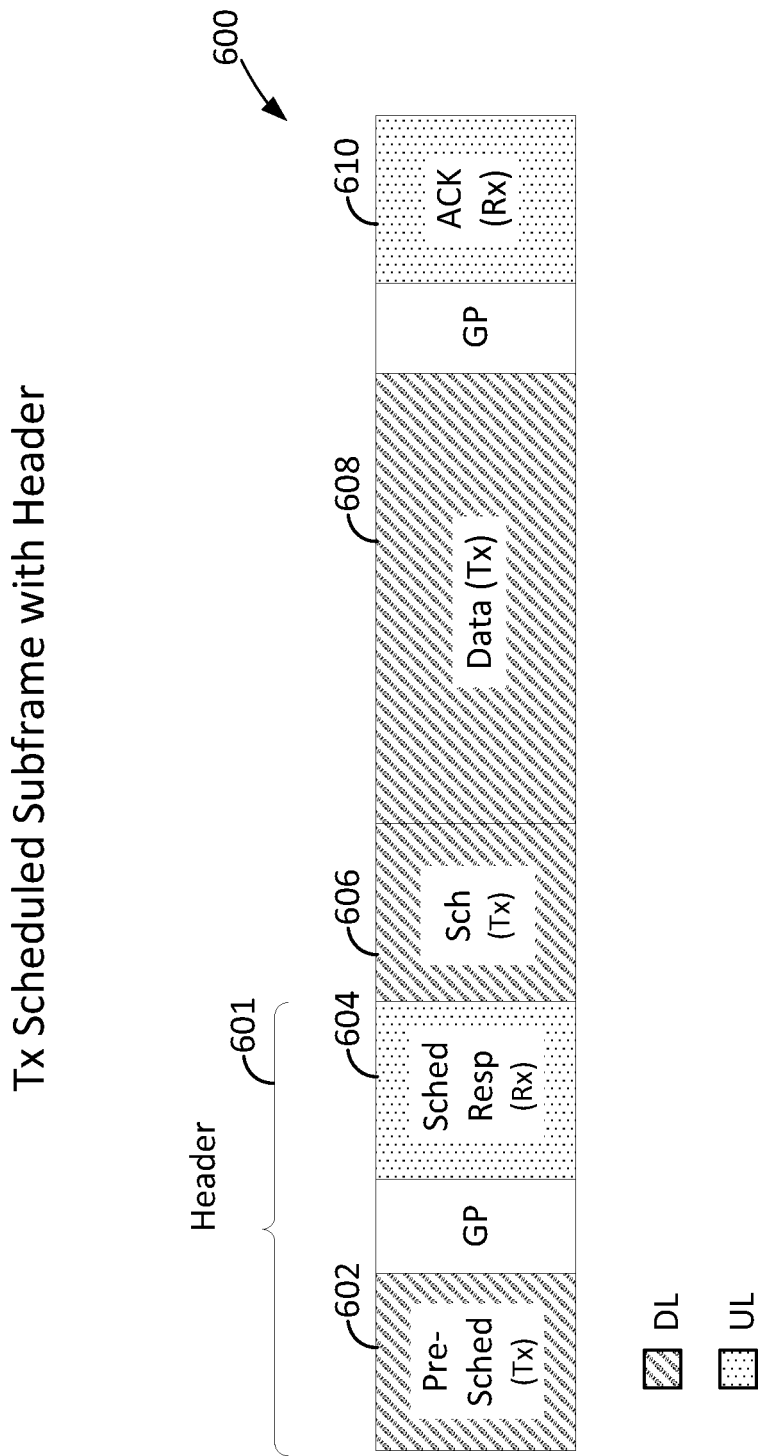
FIG. 6 is a diagram illustrating a Tx-scheduled self-contained subframe with an extended header portion in accordance with an aspect of the disclosure.

FIG. 6 is a diagram illustrating a Tx-scheduled self-contained subframe 600 with a header portion in accordance with an aspect of the disclosure. In one example, the Tx-scheduled subframe 600 may be a TDD self-contained subframe and may have a configurable duration. In some examples, the duration of the TDD self-contained subframe may be fixed. The Tx-scheduled subframe 600 has a header portion 601, which includes a pre-scheduling portion 602 (Pre-Sched) and a scheduling response portion 604 (Sched Resp). The header portion 601 allows bi-directional communications (UL and DL) within the same subframe. The pre-scheduling portion 602 and scheduling response portion 604 may be separated by a guard period (GP). In this example, the pre-scheduling portion 602 may be a downlink (DL) portion, and the scheduling response portion 604 may be an uplink (UL) portion. The Tx-scheduled subframe 600 also has a control portion 606, a data transmission portion 608, and an acknowledgement portion 610, similar to those of the subframe 500 of FIG. 5.

The header portion 601 may be configured to facilitate bi-directional communications between a scheduling entity 102 (FIG. 2) and one or more subordinate entities 104 (FIG. 3) using at least one of time division multiplexing, frequency division multiplexing, code division multiplexing, or any suitable multiplexing scheme. In some aspects of the disclosure, a scheduling entity may utilize the pre-scheduling portion 602 to transmit information (e.g., pre-scheduling information) such as channel parameters to one or more subordinate entities. Non-limiting examples of channel parameters include time-frequency assignment, channel state, channel quality, and interference. The scheduling entity may utilize the scheduling response portion 604 to receive scheduling response and status information from the subordinate entities. In one example, Pre-scheduling transmission contains pilots from the scheduling entity to the intended receivers (or subordinate entities). This also provides opportunity for the receivers to measure channel response from the scheduling entity of interest along with other possible interfering scheduling entities. This information about the desired signal strength as well as the extent of interference experienced can be sent back during the scheduling response duration (scheduling response portion 604). This can help in determining the rate at which communication can be carried out over the link successfully along with any interference co-ordination between the scheduling entities including muting some transmissions during the subframe.

Broadly, a scheduling entity may utilize the pre-scheduling portion 602 to provide or request information to/from one or more subordinate entities. The subordinate entity may utilize the scheduling response portion 604 to provide or communicate suitable information and/or data to the scheduling entity. The pre-scheduling and scheduling response portions may also be utilized for control and handshaking functionality, which may be utilized in various aspects of the disclosure. Some non-limiting applications include a massive multiple-input and multiple-output (MIMO) deployment, a mesh, a device-to-device (D2D) deployment, a network deployment utilizing unlicensed spectrum, a coordinated multi-point (CoMP) deployment, etc.

In one aspect of the disclosure, the Tx-scheduled subframe 600 may be utilized in a massive MIMO system. Some examples of Massive MIMO systems include Large-Scale Antenna Systems, Very Large MIMO, Hyper MIMO, and Full-Dimension MIMO. A massive MIMO system may utilize a large number of service antennas that are operated fully coherently and adaptively. In one example of a massive MIMO implementation in a TDD system, a scheduling entity may utilize the pre-scheduling portion 602 to request one or more subordinate entities to provide certain information to the scheduling entity.

In the massive MIMO example, the scheduling entity may utilize the pre-scheduling portion 602 to transmit a CSI-RS (DL transmission), and a subordinate entity may utilize the scheduling response portion 604 to report the corresponding CQI and SRS (UL transmission). The SRS may be utilized by the scheduling entity to estimate the uplink channel quality. Due to reciprocity of channel response in TDD systems, SRS signal may also be used by the scheduling entity to determine the direction of transmission for optimizing the link metrics such as user throughput or minimizing interference to unintended users. A subordinate entity may utilize the scheduling response portion 604 to transmit one or more UL data packets or information, which may be acknowledged by the scheduling entity in the following data transmission portion 608 of the subframe. In some examples, a scheduling entity may select a subset (one or more) of the subordinate entities pre-scheduled for data transmission based on the scheduling response. The subframe 600 is self-contained because all data transmissions of the subframe may be acknowledged by the receiving end within the same subframe. In some aspects of the disclosure, the acknowledgement portion 610 may also carry other data transmissions from one or more subordinate entities to the scheduling entity.

In one aspect of the disclosure, the Tx-scheduled subframe 600 may be utilized for communications between devices in a D2D system. A D2D device can take turns to act as a scheduling entity or subordinate entity. In some examples, a Tx node may be a scheduling entity 102, and an Rx node may be a subordinate entity 104. In one example, when a D2D device is a scheduling entity, it may communicate with other D2D devices that are acting as subordinate entities.

In one aspect of the disclosure, a scheduling entity may transmit a polling signal or message to a set (one or more) of subordinate entities utilizing the pre-scheduling portion 602 of the subframe 600. For example, the scheduling entity may poll the subordinate entities to determine their communications capability (e.g., frequency bands, bandwidth, protocol, RAT, speed etc.). In response to the polling signal, a subordinate entity may respond utilizing the scheduling response portion 604 of the subframe, providing the scheduling entity with its communications capability such as channel quality, bandwidth, bands, carriers, and other abilities. Based on the response from the subordinate entity, the scheduling entity may select a subset (one or more) of the subordinate entities to communicate with utilizing the data transmission portion 608 of the subframe. A subordinate entity may utilize the acknowledgement portion 610 to acknowledge (e.g., ACK or NACK) the data communications in the same subframe. In some aspects of the disclosure, the acknowledgement portion 610 may also carry other transmissions or data from the D2D devices.

In one aspect of the disclosure, the Tx-scheduled subframe 600 may be utilized to facilitate unlicensed spectrum communications. Unlicensed spectrum may also be known as open spectrum or free spectrum. Different wireless devices may share the unlicensed spectrum and could cause interference to each other if multiple devices attempt to use the same unlicensed frequency spectrum or band for communications at the same time. In one example, a first wireless device (e.g., a scheduling entity or a polling device) may utilize the pre-scheduling portion 602 of the subframe 600 to poll or inquire a potential set (one or more) of second wireless devices (e.g., subordinate entities) about the possibility of data communications utilizing the unlicensed spectrum. The first wireless device may also utilize the pre-scheduling portion 602 to alert other nodes or devices in the vicinity or communications range about the intended occupancy of the unlicensed medium and/or impending data communication. In response to the polling signal from the first wireless device, a polled wireless device may utilize the scheduling response portion 604 to indicate its preparedness or capability for communications utilizing the unlicensed spectrum. At the same time, the transmission of the scheduling response portion 604 (e.g., polling signal) may alert other neighboring nodes or devices about the intended use of the unlicensed medium or spectrum. In some examples, a polled device (e.g., a subordinate entity) may utilize the scheduling response portion 604 to provide link quality information (e.g., SRS) to the polling device (e.g., a scheduling entity).

In one aspect of the disclosure, the Tx-scheduled subframe 600 may be utilized in a Co-ordinated Multipoint (CoMP) transmission system. CoMP is an inter-cell cooperation technology that can improve cell coverage, cell-edge throughput, and/or system efficiency. One example of CoMP is LTE Coordinated Multipoint. In a CoMP system, there are various types of inter-cell cooperation, for example, Coordinated Scheduling (CS), Coordinated Beamforming (CB), Joint Transmission (JT), and Dynamic Point Selection (DPS). With CoMP, a wireless device (e.g., UE) at the cell edge can communicate not only with the serving cell, but also other cell(s), through cooperation with one another. A CoMP device may receive signals from multiple cells (e.g., base stations) simultaneously, and the CoMP device's transmission may be received by multiple cells simultaneously. In one example, one or more cells (e.g., scheduling entities) may wish to communicate with one or more UEs (e.g., subordinate entities), and each UE may be in communications with one or more cells at the same time.

CoMP relies on up-to-date channel state information. If the base stations have the UE's channel information beforehand, the base stations can transmit precoded data streams with suitable weighting to the UEs to improve reception. To this end, the UEs may measure their channels, and report the corresponding Channel State Information (CSI) to the base stations. In one aspect of the disclosure, a base station (a scheduling entity) may transmit to the UE (a subordinate entity) a CSI-RS message in the pre-scheduled portion 602 of the subframe 600. The CSI-RS message instructs the UE to measure its CSI. In response, the UE measures the CSI and may report it back to the base station in the scheduled response portion 604 of the subframe.

In the above-described examples, the Tx-scheduled subframe 600 may have a fixed or configurable duration with deterministic switching locations between UL and DL transmissions. In some aspects of the disclosure, the scheduled response portion 604 may also carry a data payload from the subordinate entity. The data payload may be acknowledged, if needed, in the subsequent data transmission portion 608 in the same subframe.

FIG. 7 is a diagram illustrating a Tx-scheduled self-contained subframe 700 with a trailer in accordance with an aspect of the disclosure. The Tx-scheduled subframe 700 is similar to the self-contained subframe 500 with the addition of a trailer portion. In one example, the Tx-scheduled subframe 700 is a self-contained TDD subframe. The subframe 700 has a control portion 702 and a data transmission portion 704, similar to those of the subframes of FIGS. 5 and 6. The control portion 702 may be called a scheduling portion. The subframe 700 further has an acknowledgement portion 706 and a trailer portion 708. The acknowledgement portion 706 and the trailer portion 708 may be called a trailer. The acknowledgement portion 706 and trailer portion 708 can be used for bi-directional communications in the same subframe between a scheduling entity and one or more subordinate entities using at least one of time division multiple access, frequency division multiple access, code division multiple access, or any other suitable multiple access scheme. In some aspects of the disclosure, the acknowledgement portion 706 may be used to receive acknowledgement information for all data packets of the data portion 704, similar to the acknowledgement portions 506, 610 of the subframes 500, 600 in FIGS. 5 and 6. In one example, a scheduling entity may utilize the acknowledgement portion 706 to receive an acknowledgment (e.g., ACK/NACK) for the data transmission portion 704 and/or other data from a subordinate entity. A scheduling entity may utilize the trailer portion 708 to transmit an acknowledgment (e.g., ACK/NACK) for the UL data received in the acknowledgement portion 706. In other examples, the trailer of the subframe 700 may be utilized for other acknowledgment/handshaking functions and data communications for a variety of applications.

In one aspect of the disclosure, a subordinate entity may utilize the acknowledgement portion 706 to transmit UL data and/or an acknowledgment (e.g., ACK/NACK packets) for the data transmission 704 (DL data). In addition, the scheduling entity may utilize the trailer portion 708 to transmit an acknowledgment (e.g., ACK/NACK packets) for the UL data received in the acknowledgement portion 706. Accordingly, the trailer of the subframe 700 may reduce application layer latency because a full UL subframe needs not be scheduled to allow the subordinate entity to transmit data and/or acknowledgment to the scheduling entity.

FIG. 8 is a diagram illustrating a Tx-scheduled self-contained subframe 800 with a header portion and a trailer portion in accordance with an aspect of the disclosure. In one example, the Tx-scheduled subframe 800 is a TDD self-contained subframe. The self-contained subframe 800 includes a header portion 802, a data transmission portion 804, and a trailer. The header portion 802 includes a pre-scheduling portion 808 (Pre-Sched) and a scheduling response portion 810 (Sched Resp), similar to those of the header portion of the subframe 600 (FIG. 6). The trailer includes an acknowledgement portion 814 and a trailer portion 816, similar to those of the trailer of the subframe 700 (FIG. 7). By providing both the header and trailer portions, the Tx-scheduled subframe 800 can provide additional opportunities for UL and DL communications between a scheduling entity and one or more subordinate entities in the same self-contained subframe. The various functions of the header portion 802 and trailer portion 816 are similar to those of subframes 600 and 700, and their description will not be repeated for brevity.

In some aspects of the present disclosure, a subframe may be configured for receiver-scheduled (Rx-scheduled) transmission. In the present disclosure, the Rx-scheduled subframe may equivalently be called an uplink-centric (UL-centric) subframe. In one example, the Rx-scheduled subframe is configured based on the assumption that the subordinate entity 104 is scheduled to transmit payload data (e.g., UL data) on a data channel (e.g., UL channel) to a scheduling entity 102.

Figure 9:
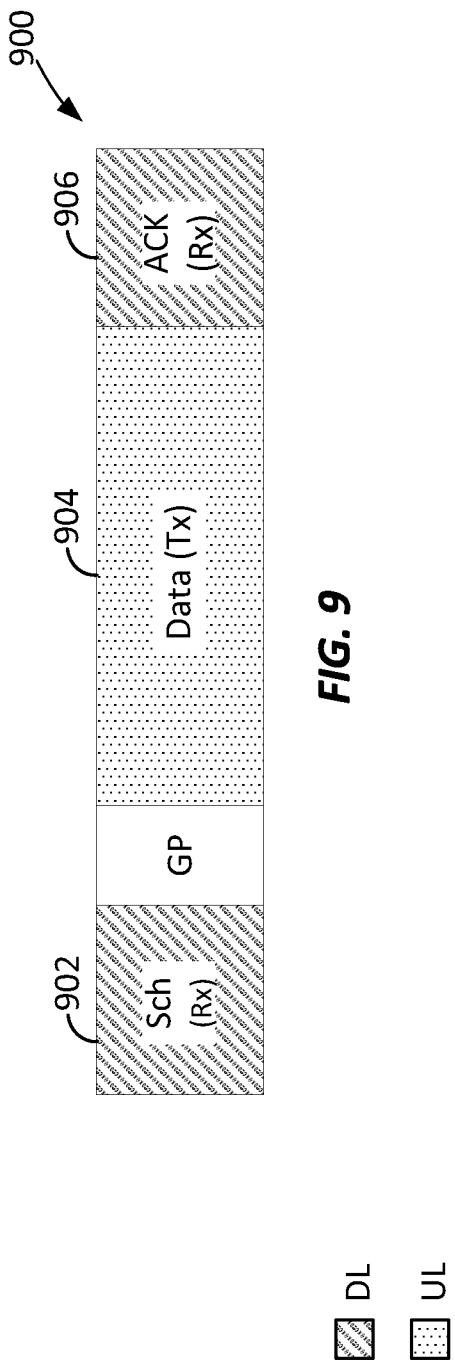
FIG. 9 is a diagram illustrating an example of an Rx-scheduled subframe in accordance with an aspect of the disclosure.

FIG. 9 is a diagram illustrating an example of an Rx-scheduled self-contained subframe 900 in accordance with an aspect of the disclosure. In one example, the Rx-scheduled subframe 900 is a TDD self-contained subframe in which all data communications may be acknowledged in the same subframe. That is, the control/scheduling information may provide control/scheduling for all of the data packets within the subframe and the acknowledgement information may include acknowledgement/non-acknowledgement (ACK/NACK) signals for all of the data packets within the subframe. The Rx-scheduled subframe 900 is an UL-centric subframe because a substantial portion of the subframe carries an UL data payload or information from a subordinate entity. The Rx-scheduled subframe 900 has a control portion 902, a data transmission portion 904, and an acknowledgement portion 906. The control portion 902 may also be called a scheduling portion. The control portion 902 and the data transmission portion 904 may be separated by a time gap or guard period (GP). The self-contained subframe 900 may have a fixed duration (t), but may also have a configurable duration determined during network deployment and/or may be updated through system messages.

In one example, a scheduling entity may utilize the control portion 902 to transmit scheduling or control information to one or more subordinate entities using at least one of time division multiple access, frequency division multiple access, code division multiple access, or any other suitable multiple access scheme. For example, the scheduling entity may transmit scheduling information (e.g., grant) on the Physical Downlink Control Channel (PDCCH) in the control portion 902 and other control information similar to those communicated in the control portion 502 of FIG. 5. The subordinate entity may transmit data (UL data) to the scheduling entity in the data transmission portion 904 based on the scheduling/control information. In response, the subordinate entity may receive an acknowledgment (e.g., ACK or NACK packets) from the scheduling entity in the acknowledgement portion 906. The scheduling entity may also utilize the acknowledgement portion 906 to transmit other data or information to the subordinate entity.

Figure 10:
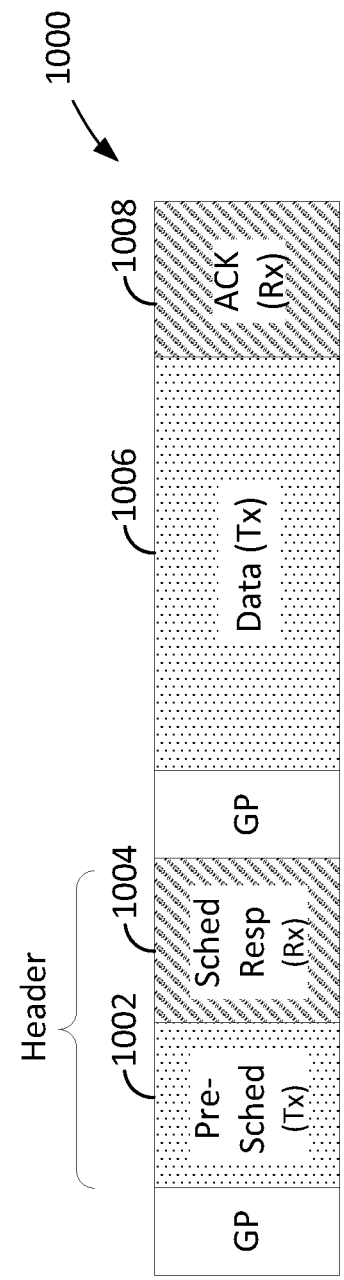
FIG. 10 is a diagram illustrating an Rx-scheduled self-contained subframe with an extended header portion in accordance with an aspect of the disclosure.

FIG. 10 is a diagram illustrating an Rx-scheduled subframe 1000 with a header in accordance with an aspect of the disclosure. In one example, the Rx-scheduled subframe 1000 is a TDD self-contained subframe with a header. The header has a pre-scheduling portion 1002 (Pre-Sched) and a scheduling response portion 1004 (Sched Resp). In some aspects of the disclosure, the scheduling response portion 1004 also provide functions similar to the control portion 902 of the subframe 900. A gap period (GP) may be provided between the pre-scheduling portion 1002 and scheduling response portion 1004. The Rx-scheduled subframe 1000 also has a data transmission portion 1006 and an acknowledgement portion 1008, similar to those of the subframe 900 of FIG. 9. Therefore, their description will not be repeated for brevity. The Rx-scheduled subframe 1000 is a self-contained subframe because the data communications is acknowledged within the same subframe without the need of another subframe.

The header of the Rx-scheduled subframe 1000 may be utilized for bi-directional (UL and DL) communications between a scheduling entity and one or more subordinate entities using at least one of time division multiple access, frequency division multiple access, code division multiple access, or any other suitable multiple access scheme. For example, a subordinate entity may utilize the pre-scheduling portion 1002 to provide or request information to/from a scheduling entity. In response, the scheduling entity may utilize the scheduling response portion 1004 to transmit the requested information and/or acknowledgment to the subordinate entity. In some aspects of the disclosure, the scheduling response portion 1004 may additionally be utilized for transmitting control or scheduling information to the subordinate entity. In this way, the header can be utilized for bi-directional communications (e.g., handshaking, scheduling control) in various applications.

In some aspects of the disclosure, the scheduling response portion 1004 may carry a small payload (e.g., DL data) from the scheduling entity such that the scheduling entity needs not wait for a DL-centric subframe (e.g., a Tx-scheduled subframe) to transmit the DL data to the subordinate entity. The acknowledgement for the small payload (DL data) may be received in the data portion 1006.

Some non-limiting applications of the Rx-scheduled subframe 1000 include a massive multiple-input and multiple-output (MIMO) deployment, a mesh, a device-to-device (D2D) deployment, a network deployment utilizing unlicensed spectrum, a coordinated multi-point (CoMP) deployment, etc. In some examples, a subordinate entity (e.g., a UE) may have multiple radios. Therefore, in such example, the subordinate entity may utilize the Rx-scheduled subframe 1000 to schedule its data transmission (e.g., UL data) such that interference among the different radios may be reduced or avoided.

FIG. 11 is a flow chart illustrating a method of wireless communications in a synchronous network for a scheduling entity to communicate with a set of one or more subordinate entities in accordance with an aspect of the disclosure. The synchronous network may utilize a time division duplex (TDD) carrier. The scheduling entity may be the same as the scheduling entities illustrated in FIGS. 1 and 2. The subordinate entities may be the same as the subordinate entities illustrated in FIGS. 1 and 3. In one aspect of the disclosure, the TDD carrier has a subframe structure having a configurable or fixed subframe duration. The subframe may be any of the self-contained subframes illustrated in FIGS. 6-8.

Referring to FIG. 11, at block 1102, a scheduling entity may provide a subframe structure for each of the plurality of subframes. The subframe structure includes a header, a control portion, a data portion, and an acknowledgement portion. At block 1104, a header communications block 220 (FIG. 2) of a scheduling entity may generate a subframe of the plurality of subframes by including bi-directional data in the header of the subframe. The UL and DL data packets of the bi-directional data may be acknowledged in the header, control portion, data portion, or acknowledgement portion of the subframe. At block 1106, the header communications block 220 (FIG. 2) may generate the subframe by including scheduling information in the control portion of the subframe. At block 1108, a data payload block 222 (FIG. 2) of the scheduling entity may generate the subframe by including data information corresponding to the scheduling information in the data portion of the subframe, wherein the data information is associated with the set of subordinate entities and includes all data packets scheduled in the control portion.

At block 1110, a trailer communications block 224 (FIG. 2) of the scheduling entity may generate the subframe by including acknowledgement information corresponding to the data information in the acknowledgement portion of the subframe, wherein all of the data packets in the data portion are acknowledged in the acknowledgement portion. At block 1112, the scheduling entity may utilize a transceiver 210 (FIG. 2) to transmit the subframe between the scheduling entity and the set of subordinate entities.

In some aspects of the disclosure, the subframe structure may further include a trailer including the acknowledgement portion and a trailer portion, and the scheduling entity may further include bi-directional data in the trailer, wherein all data packets of the bi-directional data are acknowledged in the trailer. The duration of the subframe structure may be configured by the scheduling entity. The bi-directional data in the header may correspond to one or more channel parameters. The one or more channel parameters may include at least one of a time-frequency assignment, a channel state, a channel quality, or an interference level. The header may have one or more switching locations between uplink and downlink transmissions. In some aspects of the disclosure, the bi-directional data of the header portion may include downlink data configured to communicate a CSI-RS, and uplink data configured to communicate at least one of CQI and SRS. In one aspect of the disclosure, the bi-directional data of the header may include downlink data configured to transmit a polling signal to one or more subordinate entities, and uplink data configured to receive communications capabilities from the one or more subordinate entities. In one aspect of the disclosure, the bi-directional data of the header portion may include downlink data configured to alert impending data transmission in the data portion of the subframe.

FIG. 12 is a flow chart illustrating a method of wireless communications in a synchronous network for a scheduling entity to communicate with a set of one or more subordinate entities in accordance with an aspect of the disclosure. The synchronous network may utilize a time division duplex (TDD) carrier. The scheduling entity may be the same as the scheduling entities illustrated in FIGS. 1 and 2. The subordinate entity may be the same as the subordinate entities illustrated in FIGS. 1 and 3. In one aspect of the disclosure, the TDD carrier has a subframe structure having a configurable or fixed subframe duration. The subframe may be any of the self-contained subframes illustrated in FIGS. 6-8.

Referring to FIG. 12, at block 1202, a scheduling entity may provide a subframe structure for each of the plurality of subframes. The subframe structure includes a control portion, a data portion, and a trailer. At block 1204, a header communications block 220 (FIG. 2) of a scheduling entity may generate a subframe of the plurality of subframes by including scheduling information in the control portion of the subframe. The scheduling information may include a time-frequency assignment of data for one or more subordinate entities. In various aspects of the disclosure, the control portion may be any of the control portions of the subframes illustrated in FIGS. 6-8.

At block 1206, a data payload block 222 (FIG. 2) of the scheduling entity may generate the subframe by including data information corresponding to the scheduling information in the data portion of the subframe, wherein the data information is associated with the set of subordinate entities and includes all data packets scheduled in the control portion. The data information may include data or information communicated in accordance with the time-frequency assignment of the control portion.

At block 1208, a trailer communications block 224 (FIG. 2) of the scheduling entity may generate the subframe by including acknowledgement information corresponding to the data information in an acknowledgement portion of the trailer, wherein all of the data packets in the data portion are acknowledged in the acknowledgement portion. At block 1210, the trailer communications block 224 (FIG. 2) of the scheduling entity may generate the subframe by including bi-directional data in the trailer of the subframe. At block 1212, the scheduling entity may utilize a transceiver 210 (FIG. 2) to transmit the subframe between the scheduling entity and the set of subordinate entities.

FIG. 13 is a flow chart illustrating a method of wireless communications in a synchronous network for a subordinate entity to communicate with a scheduling entity in accordance with an aspect of the disclosure. The synchronous network may utilize a time division duplex (TDD) carrier. The subordinate entity may be the same as any of the subordinate entities illustrated in FIGS. 1 and 3. In one aspect of the disclosure, the TDD carrier has a subframe structure having a configurable or fixed subframe duration. The subframe may be the self-contained subframe illustrated in FIG. 10.

Referring to FIG. 13, at block 1302, a subordinate entity may provide a subframe structure for each of the plurality of subframes. The subframe structure includes a header, a control portion, a data portion, and an acknowledgement portion. At block 1304, a header communications block 320 (FIG. 3) of a subordinate entity may generate a subframe of the plurality of subframes by including bi-directional data in the header of the subframe, wherein all data packets of the bi-directional data are acknowledged in the header. At block 1306, the header communications block 320 may generate the subframe by including scheduling information in the header of the subframe. At block 1308, a data payload block 322 (FIG. 3) of the subordinate entity may generate the subframe by including data information corresponding to the scheduling information in the data portion of the subframe, wherein the data information is associated with the scheduling entity and includes all data packets scheduled in the header.

At block 1310, a trailer communications block 324 (FIG. 3) of the subordinate entity may generate the subframe by including acknowledgement information corresponding to the data information in the acknowledgement portion of the subframe, wherein all of the data packets in the data portion are acknowledged in the acknowledgement portion. At block 1312, the subordinate entity may utilize a transceiver 310 (FIG. 3) to transmit the subframe between the subordinate entity and the scheduling entity.

Of course, these examples are merely provided to illustrate certain concepts of the present disclosure. Those of ordinary skill in the art will comprehend that these are merely exemplary in nature, and other examples may fall within the scope of the disclosure and the appended claims.

As those skilled in the art will readily appreciate, various aspects described throughout this disclosure may be extended to any suitable telecommunication system, network architecture, and communications standard. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be-defined wide area network standards. The actual telecommunication standard, network architecture, and/or communications standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-4 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-4 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication in a synchronous network for a scheduling entity to communicate with a subordinate entity utilizing a plurality of slots on a time division duplex (TDD) carrier, the method comprising:
   transmitting to the subordinate entity, in a first portion of a slot, first control information;
   receiving from the subordinate entity, in a second portion of the slot, first data information corresponding to the first control information;
   transmitting to the subordinate entity, in a third portion of the slot, at least one of second data information or second control information, based on at least one of the first control information or the first data information; and
   receiving from the subordinate entity, in a fourth portion of the slot, third data information based on at least one of the second control information or the second data information,
   wherein a duration of the slot is a transmission time interval (TTI).

2. The method of claim 1, further comprising transmitting to the subordinate entity, downlink user data in the first portion based on the first control information.

3. The method of claim 1, wherein:
   the first control information comprises a downlink grant; and
   the second data information comprises downlink user data based on the downlink grant.

4. The method of claim 3, wherein the third data information comprises feedback information corresponding to the downlink user data.

5. The method of claim 2, wherein:
   the second control information comprises an uplink grant; and
   the third data information comprises at least one of uplink user data based on the uplink grant.

6. The method of claim 1, further comprising receiving from the subordinate entity, third control information based on the second data information.

7. The method of claim 1, wherein the first control information comprises one or more channel parameters including at least one of a time-frequency assignment, a channel state, a channel quality, or an interference level.

8. The method of claim 1, wherein the first control information comprises a channel-state information—reference signal (CSI-RS).

9. The method of claim 8, wherein the first data information comprises at least one of a channel quality indicator (CQI) based on the CSI-RS.

10. The method of claim 1, wherein the first control information comprises a polling signal configured to determine a communication capability of the subordinate entity.

11. The method of claim 10, wherein the first data information comprises communications capability of the subordinate entity, the communication capability comprising at least one of a channel quality, bandwidth, bands, or carriers.

12. The method of claim 1, wherein the first control information comprises at least one of a scheduling grant, synchronization information, or frequency information.

13. The method of claim 1, further comprising receiving a sounding reference signal (SRS) in the fourth portion.

14. A method of wireless communication in a synchronous network for a subordinate entity to communicate with a scheduling entity utilizing a plurality of slots on a time division duplex (TDD) carrier, the method comprising:
   receiving from the scheduling entity, in a first portion of a slot, first control information;
   transmitting to the scheduling entity, in a second portion of the slot, first data information corresponding to the first control information;
   receiving from the scheduling entity, in a third portion of the slot, at least one of second data information or second control information based on at least one of the first control information or the first data information; and
   transmitting to the scheduling entity, in a fourth portion of the slot, third data information based on at least one of the second control information or the second data information,
   wherein a duration of the slot is a transmission time interval (TTI).

15. The method of claim 14, further comprising receiving from the scheduling entity, downlink data in the first portion based on the first control information.

16. The method of claim 14, wherein:
the first control information comprises a downlink grant; and
the second data information comprises downlink user data based on the downlink grant.

17. The method of claim 16, wherein the third data information comprises feedback information corresponding to the downlink user data.

18. The method of claim 14, wherein:
the second control information comprises an uplink grant; and
the third data information comprises at least one of uplink user data based on the uplink grant.

19. The method of claim 14, further comprising transmitting to the scheduling entity, third control information based on the second data information.

20. The method of claim 14, wherein the first control information comprises one or more channel parameters including at least one of a time-frequency assignment, a channel state, a channel quality, or an interference level.

21. The method of claim 14, wherein the first control information comprises a channel-state information—reference signal (CSI-RS).

22. The method of claim 21, wherein the first data information comprises at least one of a channel quality indicator (CQI) based on the CSI-RS.

23. The method of claim 14, wherein the first control information comprises a polling signal configured to determine a communication capability of the subordinate entity.

24. The method of claim 23, wherein the first data information comprises communications capability of the subordinate entity, the communication capability comprising at least one of a channel quality, bandwidth, bands, or carriers.

25. The method of claim 14, wherein the first control information comprises at least one of a scheduling grant, synchronization information, or frequency information.

26. The method of claim 14, further comprising transmitting a sounding reference signal (SRS) in the fourth portion.

27. A scheduling entity for wireless communications in a synchronous network, comprising:
a communication interface configured to communicate with a subordinate entity utilizing a plurality of slots on a time division duplex (TDD) carrier;
a memory; and
a processor comprising circuitry operatively coupled with the communication interface and the memory, configured to:
transmit to the subordinate entity, in a first portion of a slot, first control information;
receive from the subordinate entity, in a second portion of the slot, first data information corresponding to the first control information;
transmit to the subordinate entity, in a third portion of the slot, at least one of second data information or second control information based on at least one of the first control information or the first data information; and
receive from the subordinate entity, in a fourth portion of the slot, third data information based on at least one of the second control information or the second data information,
wherein a duration of the slot is a transmission time interval (TTI).

28. The scheduling entity of claim 27, wherein the processor and the memory are further configured to:
transmit to the subordinate entity, downlink user data in the first portion based on the first control information.

29. The scheduling entity of claim 27, wherein:
the first control information comprises a downlink grant; and
the second data information comprises downlink user data based on the downlink grant.

30. The scheduling entity of claim 29, wherein the third data information comprises feedback information corresponding to the downlink user data.

31. The scheduling entity of claim 27, wherein:
the second control information comprises an uplink grant; and
the third data information comprises at least one of uplink user data based on the uplink grant.

32. The scheduling entity of claim 27, wherein the processor and the memory are further configured to:
receive from the subordinate entity, third control information based on the second data information.

33. The scheduling entity of claim 27, wherein the first control information comprises one or more channel parameters including at least one of a time-frequency assignment, a channel state, a channel quality, or an interference level.

34. The scheduling entity of claim 27, wherein the first control information comprises a channel-state information—reference signal (CSI-RS).

35. The scheduling entity of claim 34, wherein the first data information comprises at least one of a channel quality indicator (CQI) based on the CSI-RS.

36. The scheduling entity of claim 27, wherein the first control information comprises a polling signal configured to determine a communication capability of the subordinate entity.

37. The scheduling entity of claim 36, wherein the first data information comprises communications capability of the subordinate entity, the communication capability comprising at least one of a channel quality, bandwidth, bands, or carriers.

38. The scheduling entity of claim 27, wherein the first control information comprises at least one of a scheduling grant, synchronization information, or frequency information.

39. The scheduling entity of claim 27, wherein the processor and the memory are further configured to:
receive a sounding reference signal (SRS) in the fourth portion.

40. A subordinate entity for wireless communications in a synchronous network, comprising:
a communication interface configured to communicate with a scheduling entity utilizing a plurality of slots on a time division duplex (TDD) carrier;
a memory; and
a processor comprising circuitry operatively coupled with the communication interface and the memory, configured to:
receive from the scheduling entity, in a first portion of a slot, first control information;
transmit to the scheduling entity, in a second portion of the slot, first data information corresponding to the first control information;
receive from the scheduling entity, in a third portion of the slot, at least one of second data information or second control information based on at least one of the first control information or the first data information; and
transmit to the scheduling entity, in a fourth portion of the slot, third data information based on at least one of the second control information or the second data information, wherein a duration of the slot is a transmission time interval (TTI).

41. The subordinate entity of claim 40, wherein the processor and the memory are further configured to:
receive from the scheduling entity, downlink data in the first portion based on the first control information.

42. The subordinate entity of claim 40, wherein:
the first control information comprises a downlink grant; and
the second data information comprises downlink user data based on the downlink grant.

43. The subordinate entity of claim 42, wherein the third data information comprises feedback information corresponding to the downlink user data.

44. The subordinate entity of claim 40, wherein:
the second control information comprises an uplink grant; and
the third data information comprises at least one of uplink user data based on the uplink grant.

45. The subordinate entity of claim 40, wherein the processor and the memory are further configured to:
transmit to the scheduling entity, third control information based on the second data information.

46. The subordinate entity of claim 40, wherein the first control information comprises one or more channel parameters including at least one of a time-frequency assignment, a channel state, a channel quality, or an interference level.

47. The subordinate entity of claim 40, wherein the first control information comprises a channel-state information—reference signal (CSI-RS).

48. The subordinate entity of claim 47, wherein the first data information comprises at least one of a channel quality indicator (CQI) based on the CSI-RS.

49. The subordinate entity of claim 40, wherein the first control information comprises a polling signal configured to determine a communication capability of the subordinate entity.

50. The subordinate entity of claim 49, wherein the first data information comprises communications capability of the subordinate entity, the communication capability comprising at least one of a channel quality, bandwidth, bands, or carriers.

51. The subordinate entity of claim 40, wherein the first control information comprises at least one of a scheduling grant, synchronization information, or frequency information.

52. The subordinate entity of claim 40, wherein the processor and the memory are further configured to:
transmit a sounding reference signal (SRS) in the fourth portion.

* * * * *